US012523349B2

(12) United States Patent
Li

(10) Patent No.: US 12,523,349 B2
(45) Date of Patent: Jan. 13, 2026

(54) MOUNTING MECHANISMS FOR ELECTRONIC LIGHTING DEVICES

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 159 days.

(21) Appl. No.: 18/332,930

(22) Filed: Jun. 12, 2023

(65) Prior Publication Data

US 2024/0084987 A1 Mar. 14, 2024

Related U.S. Application Data

(63) Continuation of application No. 15/212,074, filed on Jul. 15, 2016, now Pat. No. 11,674,651.

(60) Provisional application No. 62/251,965, filed on Nov. 6, 2015, provisional application No. 62/195,778, filed on Jul. 22, 2015, provisional application No. 62/195,720, filed on Jul. 22, 2015, provisional application No. 62/195,718, filed on Jul. 22, 2015, provisional application No. 62/195,714, filed on Jul. 22, 2015.

(51) Int. Cl.
*F21S 10/04* (2006.01)
*F21Y 115/10* (2016.01)

(52) U.S. Cl.
CPC ......... *F21S 10/046* (2013.01); *F21Y 2115/10* (2016.08)

(58) Field of Classification Search
CPC . F21S 10/046; F21Y 2115/10; F21W 2121/00
USPC .................................................. 362/249.02
See application file for complete search history.

(56) References Cited

U.S. PATENT DOCUMENTS

| | | | | |
|---|---|---|---|---|
| 6,422,913 B1 * | 7/2002 | Trejo | A63H 33/40 73/170.05 |
| 9,574,748 B2 * | 2/2017 | Dong | F21V 14/08 |
| 2014/0104812 A1 * | 4/2014 | Patton | F21V 21/002 362/362 |
| 2015/0233538 A1 * | 8/2015 | Sheng | F21S 6/001 362/190 |
| 2015/0292697 A1 | 10/2015 | Lai | |
| 2016/0138770 A1 * | 5/2016 | Patton | F21S 10/046 362/284 |

FOREIGN PATENT DOCUMENTS

| | | |
|---|---|---|
| CN | 101865413 A | 10/2010 |
| CN | 102434843 A | 5/2012 |
| CN | 102563510 A | 7/2012 |
| CN | 202442258 U | 9/2012 |
| CN | 203533409 U | 4/2014 |
| CN | 203784814 U | 8/2014 |

(Continued)

*Primary Examiner* — Thien M Le
*Assistant Examiner* — Tae W Kim
(74) *Attorney, Agent, or Firm* — Perkins Coie LLP

(57) ABSTRACT

Flameless candles are described that improve the mounts used to support the flame sheet. The improved mounts can include a support base or a hook for movably supporting a flame sheet. The enhanced mounts improve the manufacturing of the assembly of the flameless candle and also enable the flame element to have a more natural flame-like flicker of light.

18 Claims, 19 Drawing Sheets

(56) References Cited

FOREIGN PATENT DOCUMENTS

| | | | | | |
|---|---|---|---|---|---|
| CN | 203880594 U | | 10/2014 | | |
| CN | 203927713 U | * | 11/2014 | | |
| CN | 203980133 U | | 12/2014 | | |
| CN | 104903643 A | * | 9/2015 | ............ | F21S 10/046 |
| CN | 204756778 U | | 11/2015 | | |
| CN | 105258070 A | | 1/2016 | | |
| CN | 205842505 U | | 12/2016 | | |

* cited by examiner

MOUNTING MECHANISMS FOR ELECTRONIC LIGHTING DEVICES

CROSS-REFERENCE TO RELATED APPLICATIONS

This patent document is a continuation of and claims the benefits and priorities of U.S. patent application Ser. No. 15/212,074, filed Jul. 15, 2016, which further claims priority to U.S. provisional patent applications: Ser. No. 62/195,714, filed on Jul. 22, 2015, entitled "Electronic Lighting Device," Ser. No. 62/195,718, filed on Jul. 22, 2015, entitled "Electronic Lighting Device," Ser. No. 62/195,720, filed on Jul. 22, 2015, entitled "Electronic Lighting Device," Ser. No. 62/195,778, filed on Jul. 22, 2015, entitled "Electronic Lighting Device," and Ser. No. 62/251,965, filed on Nov. 6, 2015, entitled "Electronic Lighting Device," the disclosures of which are hereby incorporated by reference herein in their entirety.

FIELD OF INVENTION

This patent document relates to flameless candles. Particularly, the present disclosure relates to novel and advantageous flameless candles that use a swinging or a tumbler mechanism to simulate a realistic flame-like flicker.

BACKGROUND

Traditional candles, when lit, provide a pleasant ambiance in places such as homes, hotels, businesses, etc. The use of traditional candles, however, can be hazardous for several reasons. For example, a traditional candle can lead to risk of fire, damage to surface caused by hot wax, injuries suffered as a result of the hot wax or the flame, and possible emission of soot. Flameless candles have become increasingly popular alternatives to traditional candles. With no open flame or hot melted wax, flameless candles provide a longer-lasting, safe, and clean alternative. There are flameless candles available that use incandescent lamps or light-emitting diodes (LEDs) as a light source. Further, these flameless candles include mechanical components that can enable a flame sheet to have a natural flame-like flicker of light.

SUMMARY OF CERTAIN EMBODIMENTS

The present application relates to several improved mechanical mounts. The improved mounts can be easily manufactured and assembled with the flame sheet. Further, the mounts of the present application can also improve the interface between the flame sheet and the mount to enable a more natural flame-like flicker of light. The disclosed exemplary embodiments relate to flameless candles that include several improved mechanism mounts for movably supporting a flame sheet of a flameless candle.

In an exemplary embodiment, a swinging mechanism support can be shaped to form a support base as disclosed in this patent document.

In another exemplary embodiment, a tumbler mechanism support can be shaped to form a support base as disclosed in this patent document.

In an exemplary embodiment, a swinging mount for use in a flameless candle is disclosed wherein the swinging mount comprises: a flame sheet having an upper portion shaped to mimic a flame of a candle, and a lower portion having a conical structure that includes a hole on one side of the conical structure; and a support member passing through the hole on the side of the conical structure, and having a first end attached to one side of the swinging mount and a second end that includes a bent section, the bent section of the support member including a top portion that contacts an internal surface of the conical structure.

In another exemplary embodiment, a swinging mount for use in a flameless candle is disclosed, wherein the swinging mount comprises: a flame sheet having an upper portion shaped to mimic a flame of a candle, and a lower portion having a conical structure; and a support stand extending upward towards the conical structure, and having a first end that allows securing the support stand within a body of the flameless candle, the support stand having a second end that includes a top portion that contacts an internal surface of the conical structure, thereby enabling the flame sheet to swing on the top portion of the support stand.

In another exemplary embodiment, a swinging mount for use in a flameless candle is disclosed, wherein the swinging mount comprises: a flame sheet having an upper portion shaped to mimic a flame of a candle, and a lower portion including a tapered structure and a counterbalance; and a support structure having a first end that allows the support structure to be securely attached to the swinging mount, the support structure having a second end that includes two spaced-apart segments that receive the flame sheet below the tapered structure and movably suspend the flame sheet within the spaced-apart segments.

In another exemplary embodiment, a tumbler mount for use in a flameless candle is disclosed, wherein the tumbler mount comprises: a flame sheet having an upper portion shaped to mimic a flame of a candle, and a lower portion having a conical structure and a magnet; and a base structure secured to the flameless candle, the base structure including a recessed area for enabling the conical structure to rest in the recessed area of the base station and to allow the conical structure to tumble or gyrate laterally along different axes in response to a magnetic force or a magnetic field.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

A prior art flameless candle is disclosed in FIGS. 1-7 to provide context for the present application and to understand the novel and advantageous aspects of the present application.

Figure 1:
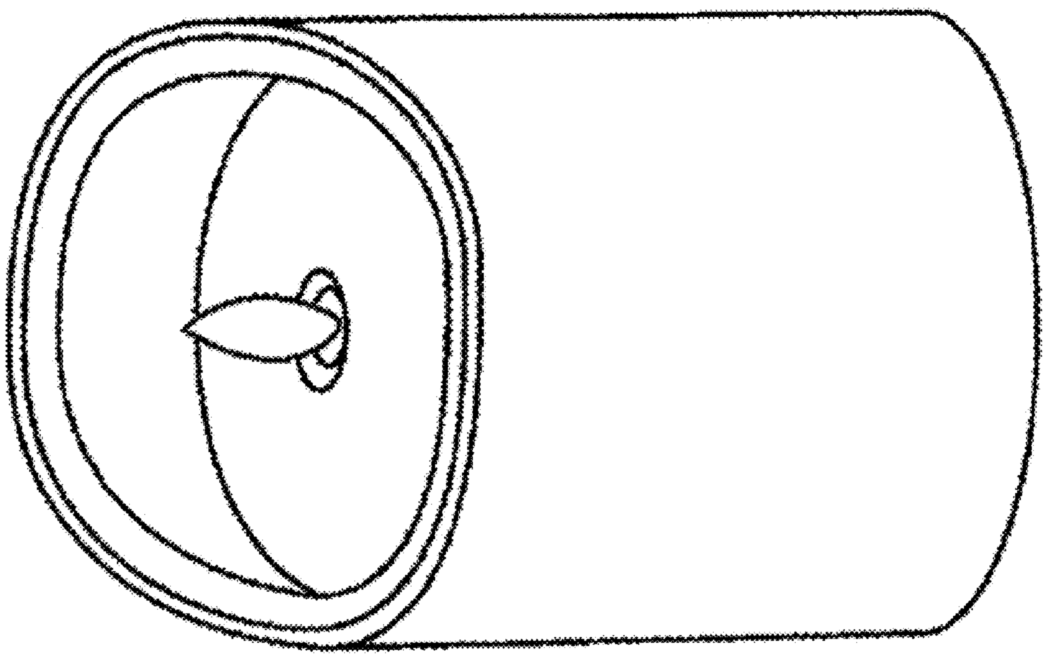
FIG. 1 is a schematic view showing an appearance of a prior art flameless candle.

FIG. 1 is a schematic view showing the appearance of a prior art flameless candle. The flameless candle, which is shaped as a true candle, comprises: a shell 1, a casing 2 sleeved within the shell 1, a core 3 and a base 4 installed within the casing 2. The casing 2 is provided with a through hole at the top-center. A flame sheet is arranged in the through hole. A portion of the flame sheet which protrudes outsides through the through hole is shaped as a flame of a burning candle. The light emitted from a light-emitting element which is disposed on the core 3 is projected, at an angle, onto the portion of the flame sheet which protrudes outsides through the through hole. Further, the flame sheet may sway freely under the action of natural winds or a swing mechanism arranged within the core 3. In this way, the flame simulated by the flameless candle, when viewed from a distance, flickers like that of a true candle, as if it is a perfectly realistic flame, and thus can be scarcely distinguished from the true one.

FIGS. 2 to 5 show that the core 3 comprises an enclosure, a flame sheet 31, a LED light 33 and a swing mechanism. The enclosure comprises left and right caps 38 and 38' having symmetrical shapes with each other. A cylindrical cavity is formed when the left and right caps 38 and 38' are arranged to engage with each other. Each of the left and right caps 38 and 38' has a semicircular notch on the top, such that a circular opening 380 is formed on the top of the cavity by the semicircular notches when the left and right caps 38 and 38' are arranged to engage with each other. The left and right caps 38 and 38' have respective left and right notches 381 and 381' on the upper portions of their sidewalls. The left and right notches 381 and 381' are concaved inwardly and inclined at a certain angle with respect to the sidewalls in such a way that an installation location for the LED light, which inclines toward and communicates with the opening 380, is formed by the left and right notches 381 and 381' when the left and right caps 38 and 38' are arranged to engage with each other. The LED light 33 is then installed at this installation location such that an angle between a longitudinal central axis of the LED light 33 and that of the cavity is about 35 degree. Moreover, the LED light 33 may be a LED element emitting concentrated light with a relatively narrow emission angle (7-10 degree). Further, combined with an appropriate area of an upper sheet 311 of the flame sheet 31, it can be assured that light emitted from the LED light 33 is maintained to be projected onto the surface of the flame sheet 31. As a result, light beams are increased in brightness and form an elliptical light spot on the surface of the flame sheet 31, so that the flame sheet 31 looks more like a flame of a true candle in shape.

Figure 6:
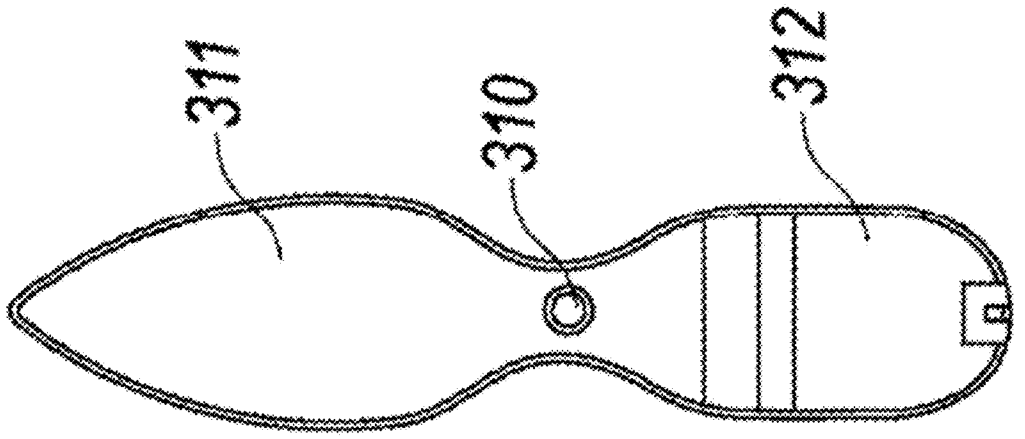
FIG. 6 is a schematic view showing a structure of a flame sheet of FIG. 1.

With reference to FIG. 6, the flame sheet 31 is of sheet type, and provided with a through hole 310 at the middle part. The flame sheet 31 is divided, by the through hole 310, into a upper sheet 311 shaped as a flame of a burning candle and a lower sheet 312. The lower sheet 312 has a counterweight slightly heavier than that of the upper sheet 311, so that the flame sheet 31 is vertically suspended in a free state (under the action of its own gravity without any external force). A supporting rod 32 passes through the through hole 310 and spans across the opening 380 of the core's cavity. The supporting rod 32 is V-shaped and depressed slightly at the middle so that the flame sheet 31 is suspended steadily at the lowest point of the supporting rod 32 since the lower sheet 312 has a counterweight slightly heavier than that of the upper sheet 311. It is easier for the flame sheet suspended vertically in a free state (under the action of its own gravity without any external force) to sway randomly under the action of an external force. In this way, the supporting rod 32 spanning across the opening 380 of the core's cavity may enable the flame sheet 31 to sway randomly under the action of an external force, such as natural winds. However, the supporting rod 32 may maintain a relatively fixed position relationship between the upper sheet 311 of the flame sheet 31 and the light outgoing direction of the LED light 33 such that the light from the LED light 33 can be projected onto the surface of the upper sheet 311 of the flame sheet 31. Since the flame sheet 31 is manufactured by a semitransparent material, a portion of the light can emerge from the back of the flame sheet 31 when the light is projected onto the flame sheet 31. In order to improve the effect of simulating a true candle's flame, a wire is embedded in the flame sheet 31 at the bottom of the upper sheet 311 to simulate a candlewick. In the case where the wire is irradiated by the light of the LED light 33 projected on the upper sheet 311, as if there is a candlewick within a flame, such that the flame sheet 31 is more like the flame of a true burning candle in visual effect. In addition, since the supporting rod 32 is irradiated by the LED light 33, a shadow of the supporting rod 32 is formed on the surface of the upper sheet of the flame sheet 31 and may also look like the candlewick.

Figure 2:
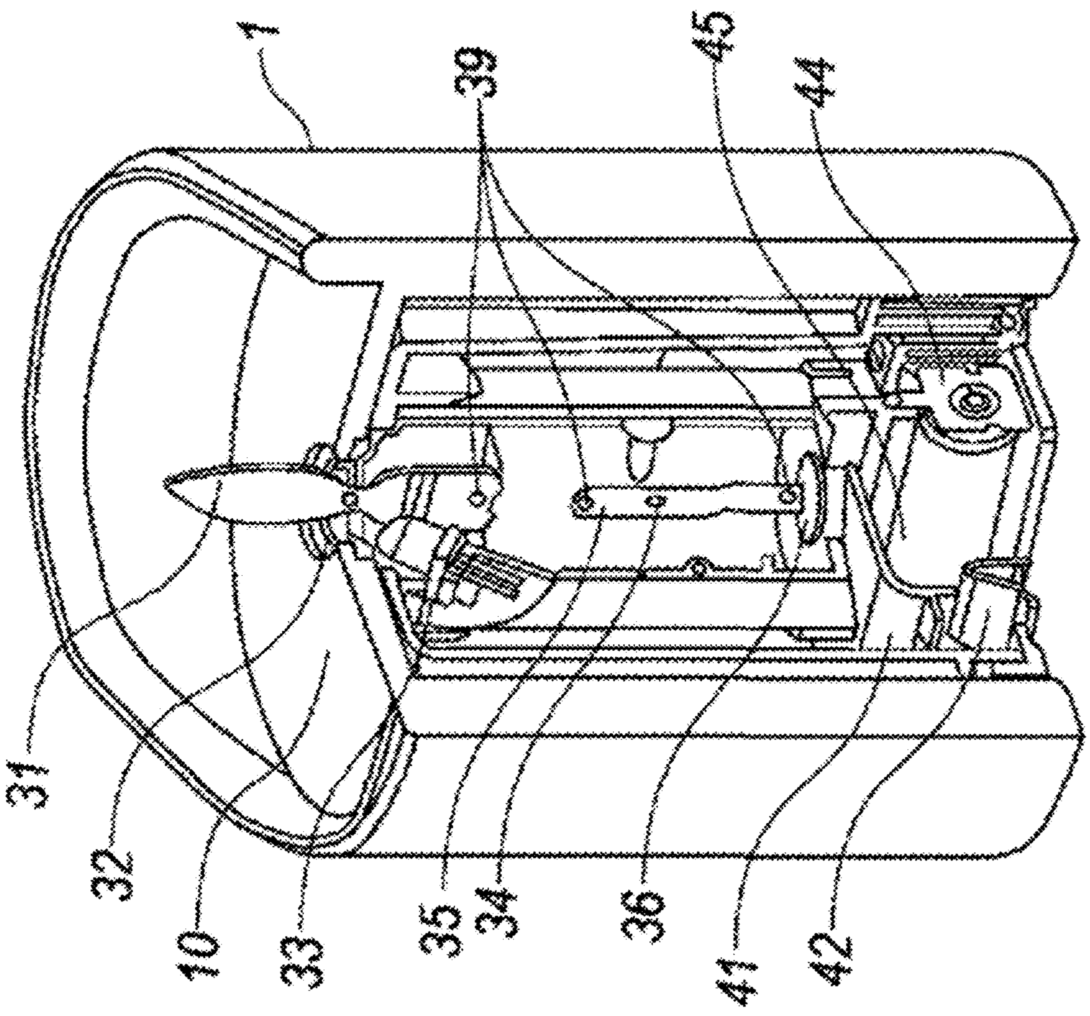
FIG. 2 is a cross-sectional view showing a structure of FIG. 1.

Regarding the flameless candle, FIG. 2 shows that the tubular shell 1 is manufactured by a transparent or semitransparent material, such as PVC. The shell 1 comprises a tubular sidewall and a diaphragm plate 10 intersected with the tubular sidewall. A through hole is provided at the middle of the diaphragm plate 10, from which the upper sheet 311 of the flame sheet 31 protrudes outsides. In order to simulate irregular wax melting when a candle is burning, a portion of the shell's sidewall above the diaphragm plate 10 is formed to have an irregular end face. For example, the sidewall may be lower in front and higher behind. The surfaces of the shell's sidewall and the diaphragm plate 10 are coated with candle wax, such that the electronic candle looks more like a true candle. The upper sheet 311 of the flame sheet 31 protrudes outsides through the through hole of the diaphragm plate 10, with its front surface (the surface projected by the light) facing a lower point of the sidewall and its back surface obscured by a higher sidewall of the shell. In this way, a user is guided to dispose the electronic candle at a preferable angle to appreciate the "candle light", that is to say, the electronic candle is viewed from the front surface of the upper sheet 311 of the flame sheet 31 and from the lower point of the sidewall. Accordingly, the effect for simulating a true candle by the electronic candle can be improved.

Figure 4:
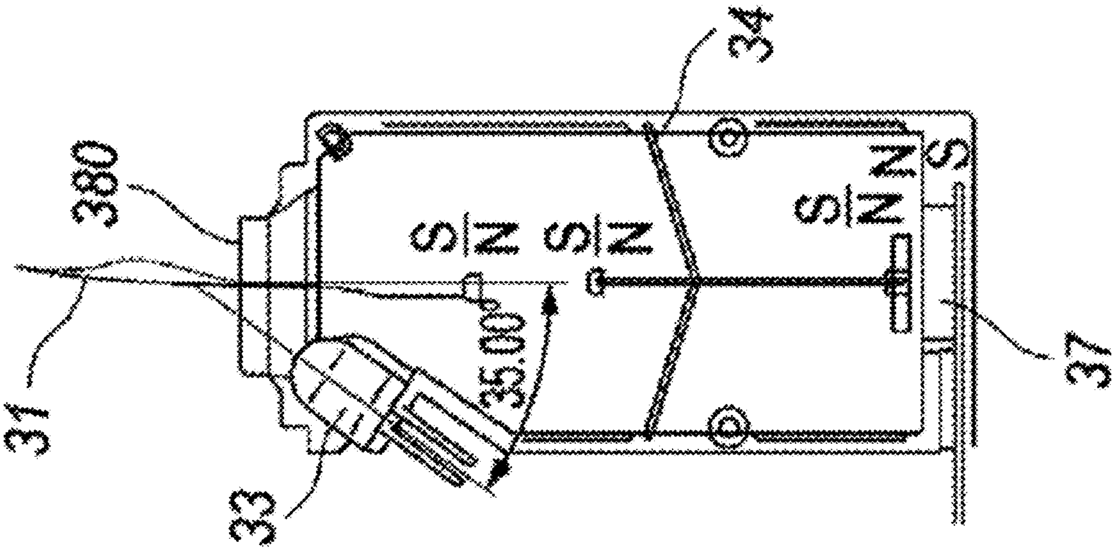
FIG. 4 is a schematic view showing a structure of a core of FIG. 1.
Figure 5:
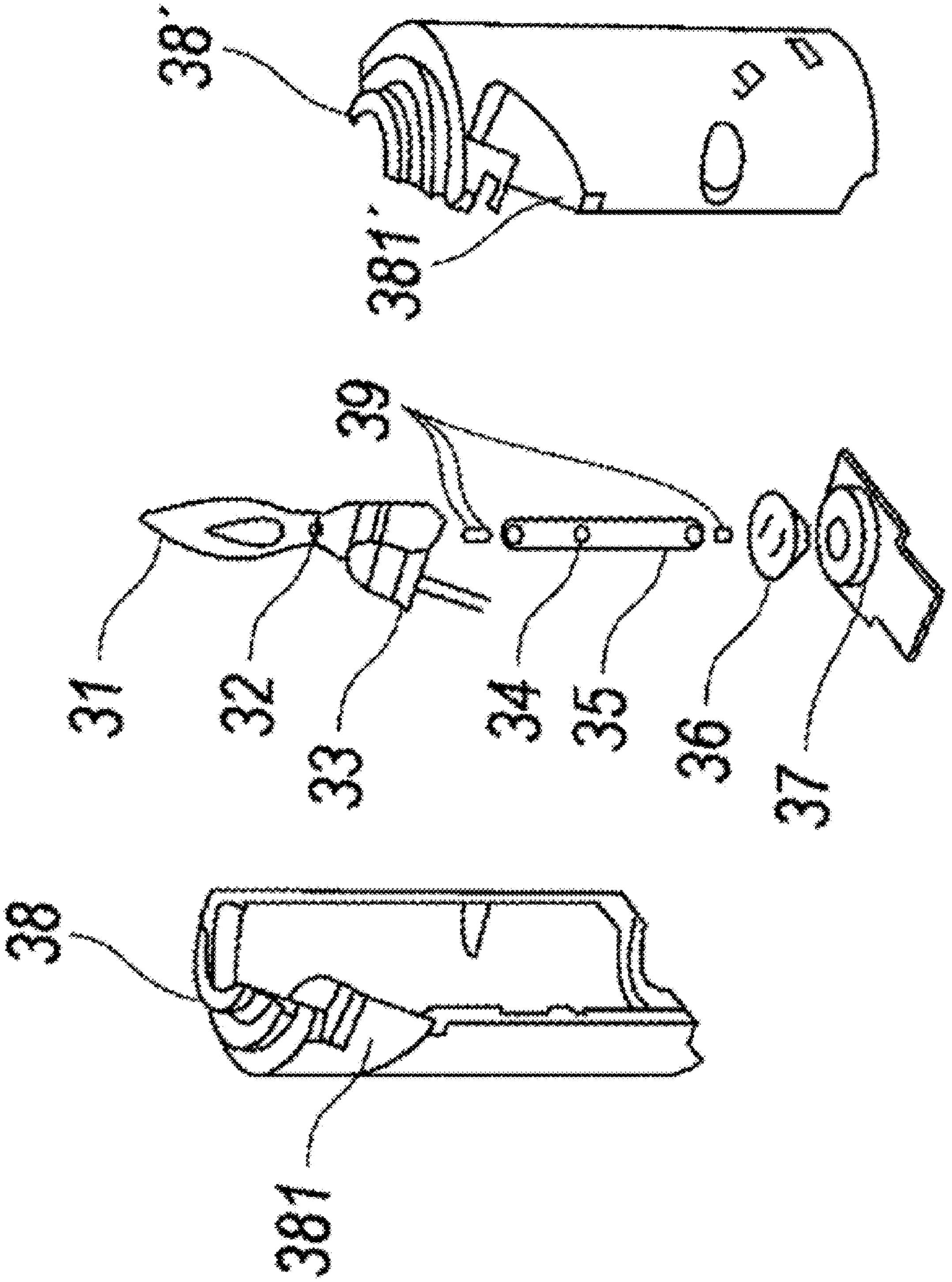
FIG. 5 is an exposed view schematically showing the structure of the core of FIG. 1.

In order to assure the effect of swaying of the flame sheet, the core is provided with a swing mechanism which maintains to act on the flame sheet directly or indirectly with a force such that the flame sheet maintains to sway or swing. As shown in FIGS. 4 and 5, the swing mechanism uses a magnetic mechanism comprising a set of magnets 39, a linkage sheet 35, a linkage rod 34 and a coil 37. The set of magnets 39 comprises a first magnet, a second magnet and a third magnet. The linkage rod 34 is movably threaded through the linkage sheet 35, and arranged to span across the core's cavity. The linkage rod 34 is V-shaped, and depressed slightly at the middle so that the linkage sheet 35 is positioned at the lowest point at the middle of the linkage rod 34. The linkage sheet 35 may be suspended freely in the core's cavity without any external force. The second and third magnets are adhered to or embedded into the upper and lower ends of the linkage sheet 35, respectively. The first magnet is adhered to or embedded into the lower end of the flame sheet 31. A magnetic pole of the first magnet facing the second magnet has a polarity opposite or same to that of a magnetic pole of the second magnet at the upper end of the linkage sheet 35 facing the first magnet, that is to say, they may attract or repel each other. The coil 37 is fastened onto a PCB subboard through a snap ring 36, and disposed beneath the lower end of the linkage sheet 35 so as to be opposite to the third magnet at the lower end of the linkage sheet 35.

The operation principle on the swaying or swinging of the flame sheet 31 is illustrated below. Firstly, an oscillation is output through a control circuit. When powered on, the coil 37 then produces a magnetic field which is opposite to the polarity of the magnet pole of the third magnet at the lower end of the linkage sheet 35 facing the coil so that the coil 37 and the third magnet at the lower end of the linkage sheet 35 repel each other. As a result, the linkage sheet 35 sways toward one side. Moreover, since the second magnet at the upper end of the linkage sheet 35 and the first magnet at the lower end of the flame sheet 31 attract or repel each other, the flame sheet 31 sways. When the coil 37 is powered off, the flame sheet 31 freely falls down under the action of its own gravity, and continues to sway in an opposite direction under an inertia potential energy until the coil 37 is powered on again. Then the inertial motion of the flame sheet 31 is changed by the magnetic force of the coil 37 via the linkage sheet 35, and a next sway cycle begins.

Figure 3:
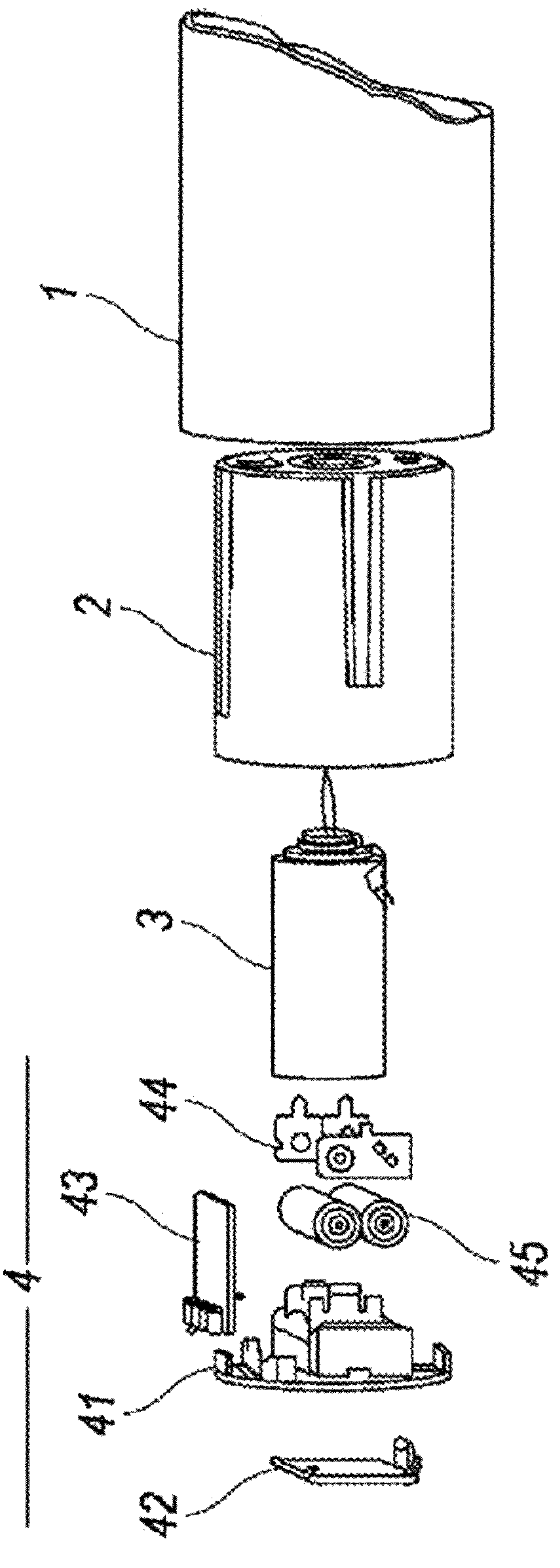
FIG. 3 is an exposed view schematically showing the structure of FIG. 1.

FIGS. 3 and 4 further describe the flameless candle by showing that the base 4 comprises a battery tray 41, a battery cover 42, a PCB mainboard 43 and pieces of battery shrapnel 44. The pieces of battery shrapnel 44 are installed on the battery tray 41 to form a battery chamber for accommodating batteries 45. The PCB mainboard 43 is installed on the battery tray 41 and arranged at one side of the battery chamber. The control circuit and a power switch are arranged on the PCB mainboard 43. The PCB mainboard 43 is electrically connected, via wires, with the LED light 33, the PCB subboard installed with the coil 37, and the pieces of batter shrapnel. The battery cover 42 is arranged at the bottom of the battery tray 41 and can be removed to enable the displacement of the batteries in the battery chamber. The core 3 is installed on the base 4, wherein the PCB subboard installed with the coil 37 is electrically connected with the PCB mainboard 43. The circumference of the battery stray 41 and the bottom of the casing 2 may be snapped together, or may be threaded with each other through a bolt. The casing 2 is a hollow cylinder, the external diameter of which is equal to or slightly larger than the internal diameter of the shell 1 so as to be tightly fitted into the shell 1. The casing 2 is provided with a through hole on the top, which is used for mating with the core 3. When the core 3 is received within the casing 2, the upper sheet 311 of the flame sheet 31 is exposed out of the casing 2 through the casing's through hole.

Figure 7:
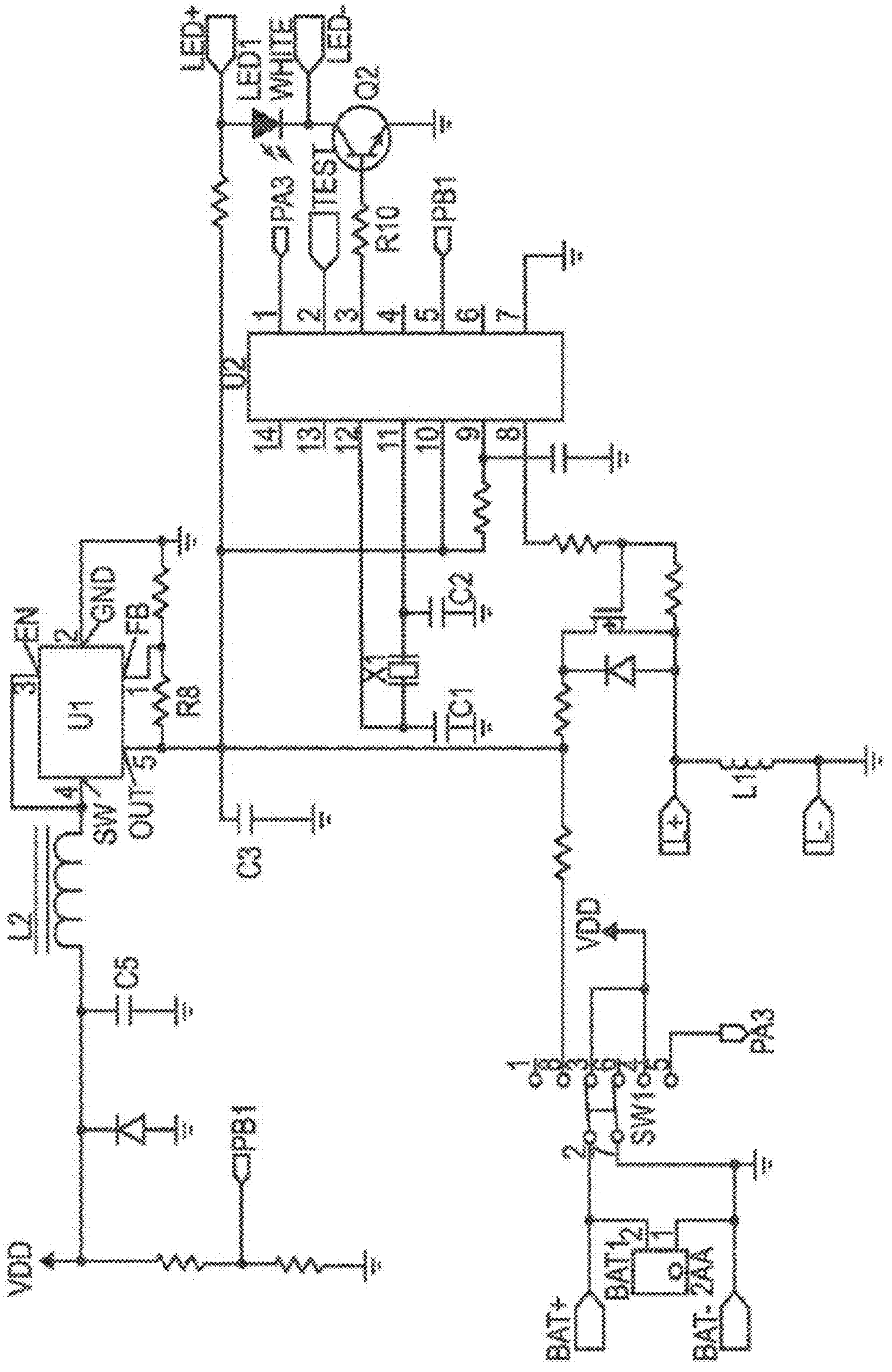
FIG. 7 is a schematic diagram showing a circuit part of FIG. 1.

FIG. 7 is a circuit schematic diagram of the flameless candle. The operation principle of the electronic candle is illustrated below with reference to FIG. 7.

In the power source part, the energy provided by the batteries is transferred, via a switch SW1, to an input pin of a boost converter U1, then into a boost circuit consisting of components such as a fifth capacitor C5, a second inductor L2, the boost converter U1, a third capacitor C3 and an eighth resistor R8. A stable voltage of 3.3V is then output from a fifth pin of the boost converter U1 to be supplied to a microprocessor U2, a LED light LED1 (expressed as the LED light 33 in the structure described above, using a warm white light similar to true fire in color) and a coil L1.

In the case where the switch SW1 is closed such that the circuit is powered by the power source part, the microprocessor U2 starts to work upon receiving a 3.3-volt voltage. When a voltage at a fifth pin (PB1) of the microprocessor U2 is above 1.82-volt, the microprocessor U2 controls an eighth pin (PWM/PCO) to output a square wave pulse of 40 ms on and 630 off. A MOS transistor Q1 and the coil L1 are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnetic field produced by the magnet at the upper end of the linkage sheet 35 is opposite to that produced by the magnet at the lower end of the flame sheet 31, the linkage 35 drives the flame sheet 31 to sway toward right or left since the linkage sheet 35 and the flame sheet 31 are arranged to be a distance from each other. Meanwhile, the microprocessor U2 controls a third pin (PB3) to output a high level so as to supply about a 0.6-volt voltage to the base of a triode Q2 via a resistor R10. Once the triode Q2 is turned on, the LED light LED1 is lighted. Then the light is projected onto the flame sheet at an angle of 35 degree. Under the action of the coil, the flame sheet, as viewed from a distance, is very similar to that of a burning candle. The optimum viewing distance is farther than 1 m from the electronic candle, the viewing angle being smaller than 120 degree.

Referring still to FIG. 7, the work of circuit in the case where the switch is switched such that the circuit is controlled by a timer and a first pin (PA3) of the microprocessor U2 is at a low level is illustrated below. On one hand, the microprocessor U2 controls the eighth pin (PWM/PCO) to output a square wave pulse of 40 ms on and 630 ms off after halting for 500 ms. The MOS transistor Q1 and the coil are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnet at the upper end of the linkage sheet 35 produce a magnetic field which is opposite to that produced by the magnet at the lower end of the flame sheet 31, the linkage sheet 35 drives the flame sheet 31 to sway toward right or left since the linkage sheet 35 and the flame sheet 31 are arranged to be a distance from each other. Meanwhile, the microprocessor U2 controls the third pin PB3 to output a high level after halting for 500 ms (that is to say, the LED light LED1 blinks for once) so as to apply about a 0.6-volt voltage to the base of the triode Q2 via the tenth resistor R10. Once the triode Q2 is turned on, the LED light LED1 is lighted. On the other hand, an oscillation circuit, which consists of a crystal oscillator X1, a first capacitor C1 and a second capacitor C2, provides standard clock information to the microprocessor U2. The timer of the microprocessor U2 starts timing upon the LED light LED1 blinks. After 5 hours, the microprocessor U2 will controls the eighth pin (PWM/PCO) and the third pin (PB3) to output a low level, so that the flame sheet stops swaying and the LED light LED 1 goes out. After next 19 hours, the microprocessor U2 controls the eighth pin (PWM/PCO) to output a square wave of 40 ms on and 630 ms off, and the PB3 to output a high level, so that the flame sheet starts to sway and the LED light LED1 is lighted. In view of the above, the total time of a cycle is 24 hours. The circuit can circularly work in this way, until the batteries exhaust or the switch is switched into other states.

In the flameless candle, when the switch is opened, the boost converter U1 and the microprocessor U2 stop working since they are not powered by the batteries. As a result, the LED light will go out, meanwhile, the flame sheet 31 stops swaying. Further, when the battery voltage is below 1.62 volt, the LED light will go out no matter that the switch is switched such that the circuit is powered by the power source part or controlled by a timer. Meanwhile, the flame sheet stops swaying, and the control circuit goes to a sleep state. The circuit restores to work until the batteries are replaced with new ones.

In the sections that follow, several exemplary embodiments are disclosed that relate to flameless candles that use a swinging or a tumbler mechanism to simulate a realistic flame-like flicker.

Embodiment 1

Figure 8:
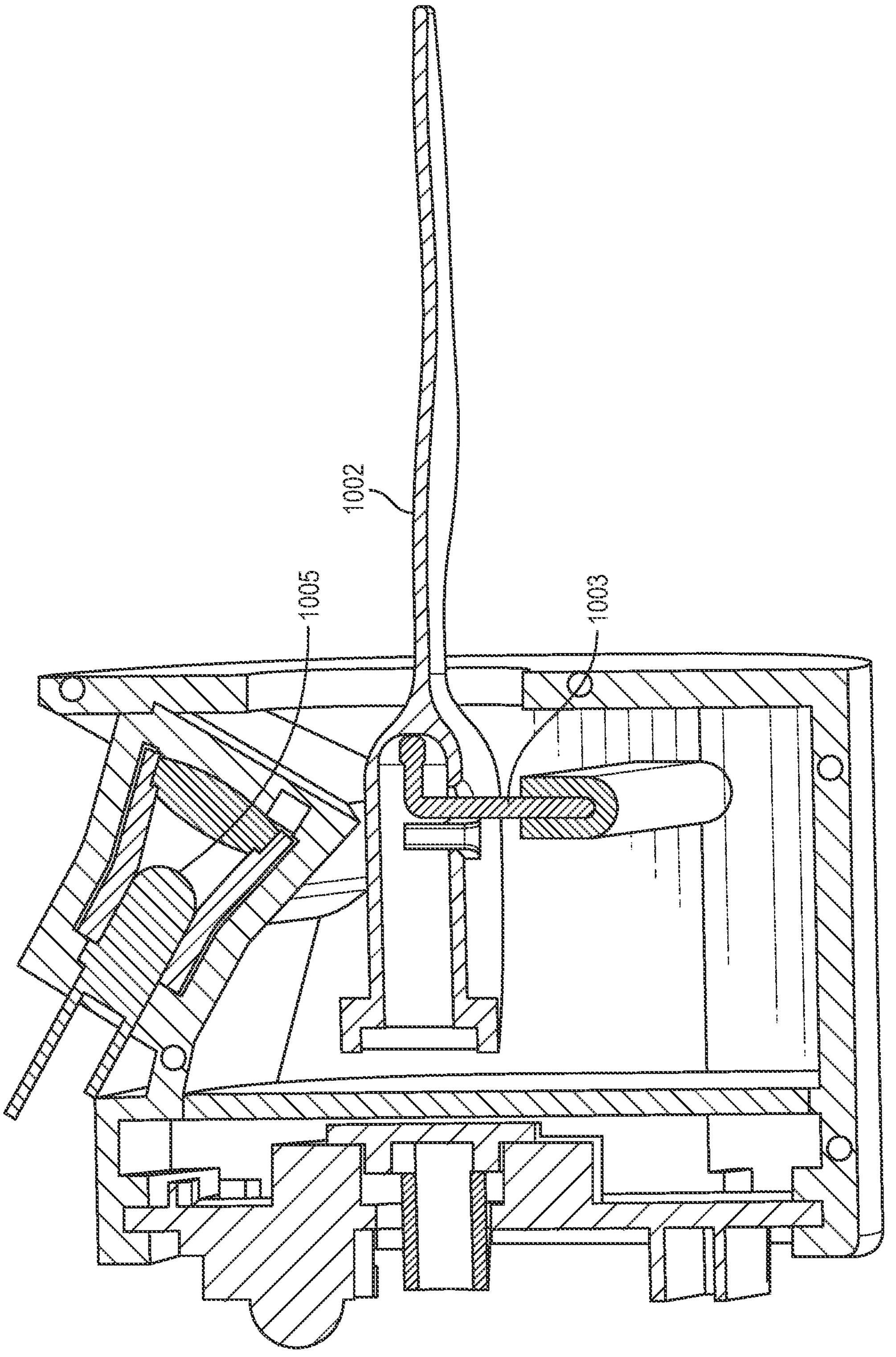
FIG. 8 is a cross-sectional view showing the structures of an exemplary first embodiment of a swinging mechanism mount for a flameless candle.
Figure 9:
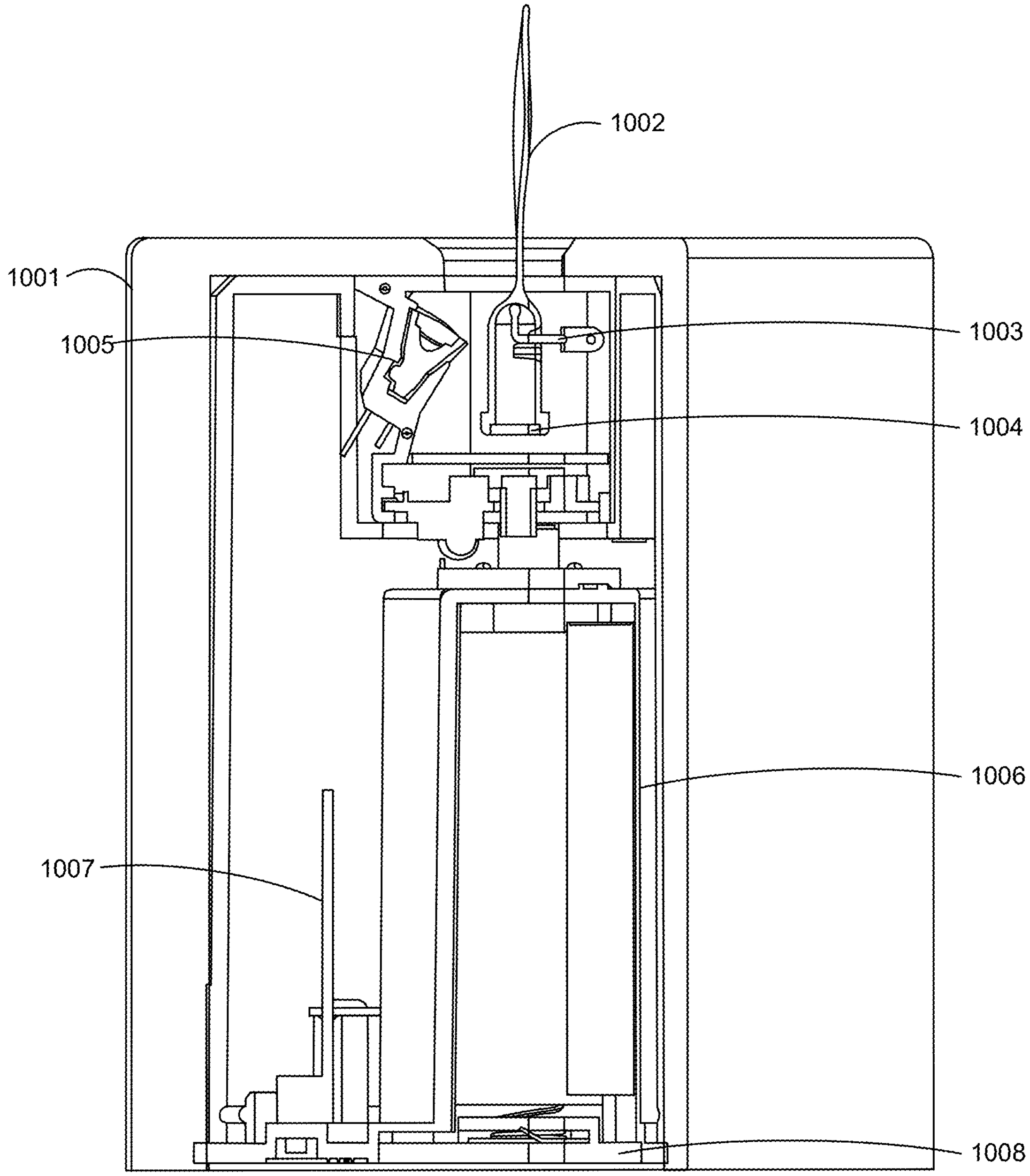
FIG. 9 is cross-sectional view showing the structures of an exemplary first embodiment of a swinging mechanism mount in a flameless candle.
Figure 10:
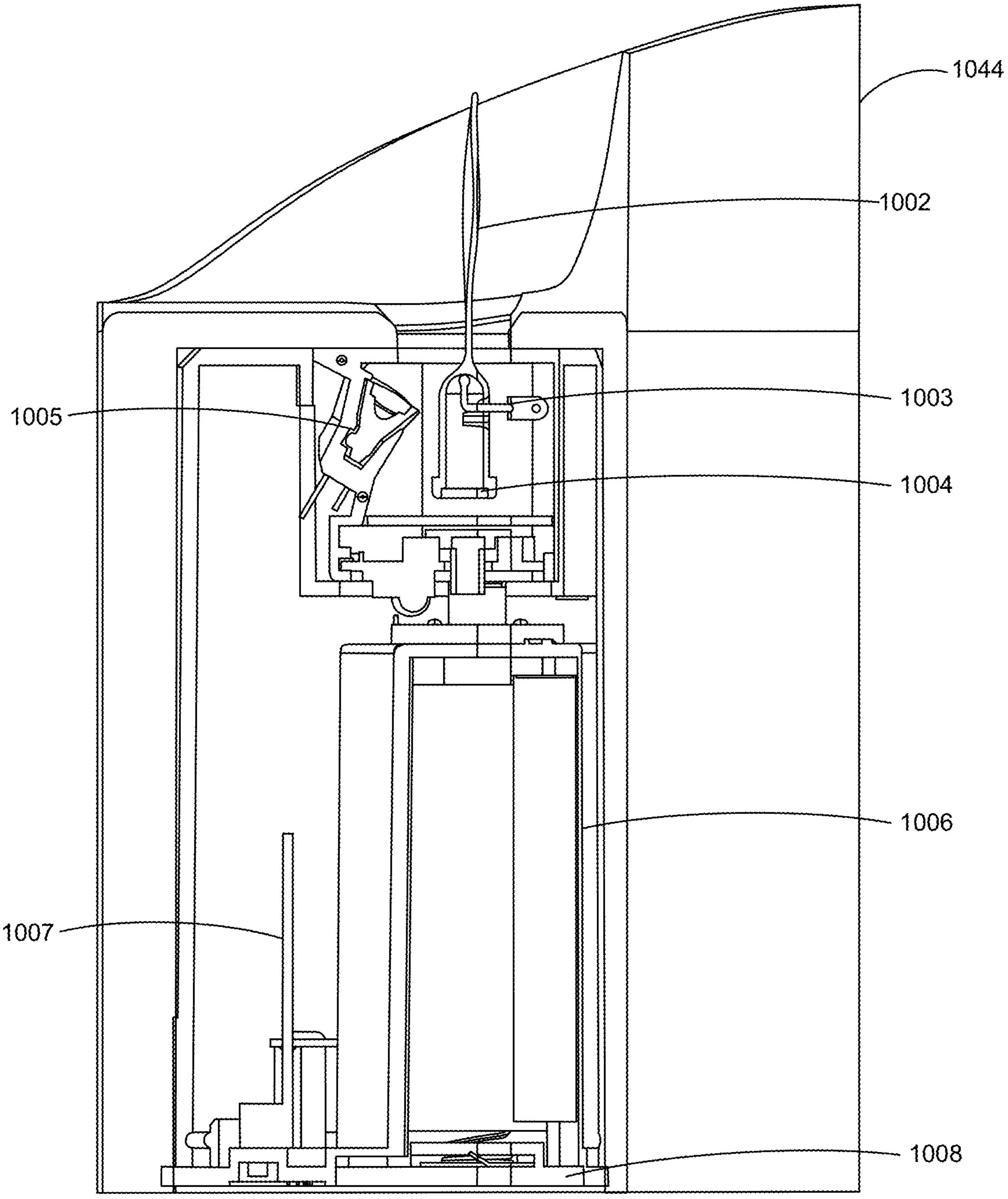
FIG. 10 is cross-sectional view showing the structures of an exemplary first embodiment of a swinging mechanism mount in another flameless candle.

An exemplary first embodiment is shown in FIGS. 8-10 that represent the various views of a swinging mechanism mount for flameless candles. The swinging mechanism mount in FIGS. 8-10 operates to move a flame sheet fluidly in multiple directions and various motions. The swinging mechanism mount is designed to allow the flame sheet to move freely in different motions including swinging laterally along different axes, moving along a curved trajectory, twisting up to a full three hundred and sixty degrees, or a combination of different motions. The movements may occur simultaneously. The swinging mechanism mount includes a hook 1003 structure for supporting the flame sheet. The hook 1003 structure is attached to an inner surface adjacent to the flame sheet and extends laterally towards the flame sheet with a bent member pointing upward to provide a top surface of the bent member positioned to receive the flame sheet. In some embodiments, the bent member can be positioned orthogonal to the portion of the hook 1003 extending from the attached inner surface. The flame sheet rests on the top surface of the bent member of the hook 1003 structure with an internal surface of the flame sheet contacting the top surface of the bent member. The internal surface of the flame sheet contacting the top surface of the hook 1003 structure can be shaped to balance or rest on a top portion of the hook 1003. For example, in an exemplary embodiment, the internal surface of the flame sheet contacting the hook 1003 can be curved (e.g., concaved surface with respect to the top portion of the hook 1003) to conform or mate with a surface of the top portion of the hook 1003 that contacts the internal surface of the flame sheet. In another exemplary embodiment, the internal surface of the flame sheet contacting the hook 1003 can be curved (e.g., concaved surface with respect to the top portion of the hook 1003) to minimize the surface area that contacts the top portion of the hook 1003. In some embodiments, the top portion of the hook 1003 can be shaped to receive or mate with the curved surface of the flame sheet. For example, the top portion of the hook 1003 can have a convex surface with respect to the internal surface of the flame sheet. In an exemplary embodiment, the hook 1003 and the internal surface of the flame sheet can be shaped to mate together as a ball-and-socket configuration. In some embodiments, the top portion of the hook 1003 and/or the internal surface of the flame sheet can be polished or otherwise treated to reduce friction. The hook 1003 may be made of plastic, metal, or a combination of both. In some exemplary embodiments, the hook 1003 may be manufactured as an integrated component of housing 1004.

The flameless candles of FIGS. 8-10 show various other structures. For example, a battery cover 1008 is located at the bottom of the body of the flameless candle. The battery cover 1008 leads to a battery housing 1006 for housing the battery that powers the flameless candle. A PCB control board 1007 is disposed within the body of the flameless candle to include various control circuitry for controlling various functions of the flameless candle. A light source 1005 is disposed under the top surface of the candle and positioned at an angle to emit source light from below the top surface of the candle toward the flame sheet 1002. The light source can be implemented using light emitting diodes (LEDs). A magnet 1004 is disposed at a base of the flame sheet to set the flame sheet 2 in motion responsive to a magnetic field created by an electromagnet component, such as the coil board 1034. The body of the flameless candle can be shaped to have a levelled-off opening 1001. In an exemplary embodiment, the body of the flameless candle can be shaped to have a melted opening 1044 as shown in FIG. 10. A battery cover 1008 leads to a battery base 1006. A positive-negative terminals provide electrical contacts to the positive and negative leads of the battery at a first end. A switch is provided to turn on or off the flameless candle. A PCB control board 1007 includes control circuitry for controlling various functions of the flameless candle. A positive terminal and a negative terminal provide electrical contracts to the positive and negative leads of the battery at the second end. A terminal support stand is provided to support the positive and negative terminals, respectively. The flameless candle can include a semi-opaque inner body, a first support stand and a second support stand. A light source 1005 can be implemented using LED lamps to emit the source light. An LED support stand provide support for the LED lens of the light source 1005. The light source 1005 can also project through the hole in the top of the candle used by flame sheet 1002. Other structures include a coil board to supply the electromagnetic field to induce the magnet 1004 to move and a coil engaging ring to support the coil board. It should be noted that some elements of the flameless candle devices that implement the swinging mechanism mount of the first embodiment were previously described in connection with FIGS. 1-7 and will not be repeated.

As such, an aspect of the disclosed embodiments relates to a swinging mechanism mount for a flameless candle that includes a flame sheet shaped to mimic a real life flame; a light source disposed to emit light to the flame sheet; and a support structure for movably supporting the flame sheet. In an exemplary embodiment of the swinging mechanism mount, the support structure is a hook.

In another embodiment, the above noted swinging mechanism mount is included in a flameless candle.

In an exemplary embodiment, a swinging mount for use in a flameless candle is disclosed wherein, the swinging mount comprises: a flame sheet having an upper portion shaped to mimic a flame of a candle, and a lower portion having a conical structure that includes a hole on one side of the conical structure; and a support member passing through the hole on the side of the conical structure, and having a first end attached to one side of the swinging mount and a second end that includes a bent section, the bent section of the support member including a top portion that contacts an internal surface of the conical structure.

In an exemplary embodiment of a swinging mount, the support member forms a hook shaped element having the bent section that is substantially orthogonal to a straight section of the support member.

In an exemplary embodiment of a swinging mount, an interior surface of the conical structure is curved to receive the top portion of the bent section.

In an exemplary embodiment of a swinging mount, the top portion of the bent section includes a curved surface.

In an exemplary embodiment of a swinging mount, the support member is formed as an integrated component of the conical structure.

In an exemplary embodiment of a swinging mount, the top portion of the bent section includes a polished surface to reduce friction with an interior surface of the conical structure of the flame sheet.

In an exemplary embodiment of a swinging mount, the bent section of the support member is positioned to support the flame sheet to allow the flame sheet to swing along different axes.

In an exemplary embodiment of a swinging mount, the support member allows the flame sheet to move along a curved trajectory.

In an exemplary embodiment of a swinging mount, the support member allows the flame sheet to twist up to a full three hundred and sixty degrees.

In an exemplary embodiment of a swinging mount, the support member comprises a plastic material, a metal, or a combination thereof.

In an exemplary embodiment, a swinging mount further comprises a light source to emit light to the flame sheet.

In an exemplary embodiment of a swinging mount, the light source comprises one or more light emitting diodes (LEDs).

In an exemplary embodiment, a flameless candle for imitating a real-life candle comprises: a body with a top surface and a bottom surface, the top surface including an opening; a flame sheet having an upper portion shaped to mimic a flame of a candle, and a lower portion having a conical structure that includes a hole on one side of the conical structure; a support member passing through the hole on the side of the conical structure, and having a first end attached to one side of the swinging mount and a second end that includes a bent section, the bent section of the support member including a top portion that contacts an internal surface of the conical structure; a light source disposed under the top surface and positioned to emit light to the flame sheet; and a motion generation engine to cause the flame sheet to move.

In an exemplary embodiment of a flameless candle, the support member forms a hook shaped element having the bent section that is substantially orthogonal to a straight section of the support member.

In an exemplary embodiment of a flameless candle, an interior surface of the conical structure is curved to receive the top portion of the bent section.

In an exemplary embodiment of a flameless candle, the top portion of the bent section includes a curved surface.

In an exemplary embodiment of a flameless candle, the support member is formed as an integrated component of the conical structure.

In an exemplary embodiment of a flameless candle, the bent section of the support member is positioned to support the flame sheet to allow the flame sheet to swing along different axes.

In an exemplary embodiment of a flameless candle, the support member allows the flame sheet to move along a curved trajectory.

In an exemplary embodiment of a flameless candle, the support member allows the flame sheet to twist up to a full three hundred and sixty degrees.

In an exemplary embodiment of a flameless candle, the support member comprises a plastic material, a metal, or a combination thereof.

In an exemplary embodiment, a flameless candle comprises: a magnet disposed at a base of the flame sheet; wherein: the motion generation engine comprises a coil located below the magnet and electrically connected to a printed circuit board, wherein a magnetic field of the coil interacts with the magnet of the flame sheet to cause the flame sheet to move.

In an exemplary embodiment of a flameless candle, the top surface of the body is flat.

In an exemplary embodiment of a flameless candle, the top surface of the body includes an irregular shape to resemble an at least partially melted candle.

In an exemplary embodiment of a flameless candle, the light source comprises one or more light emitting diodes (LEDs).

Embodiment 2

Figure 11:
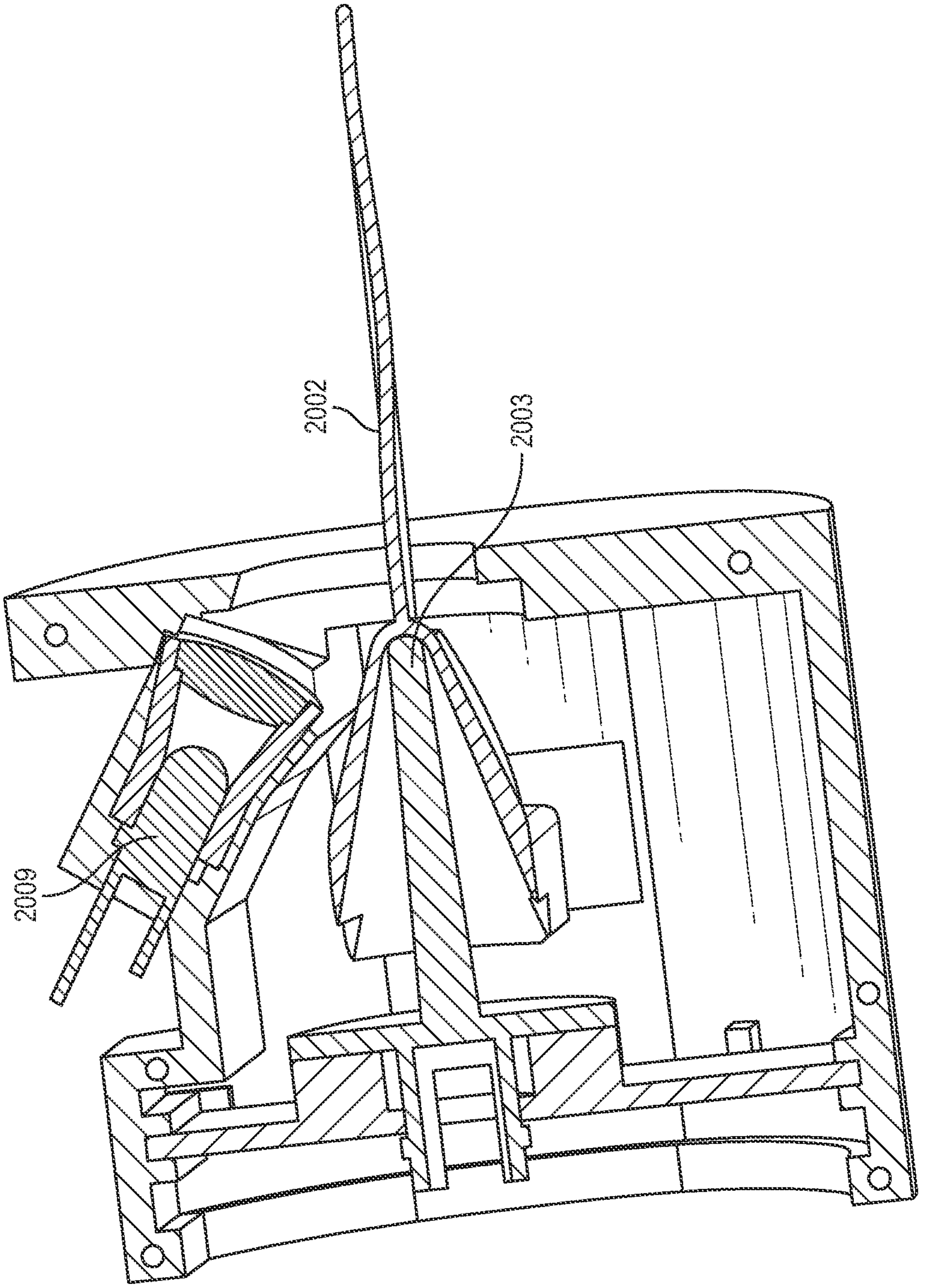
FIG. 11 is a cross-sectional view showing the structures of an exemplary second embodiment of a swinging mechanism mount for a flameless candle.
Figure 12:
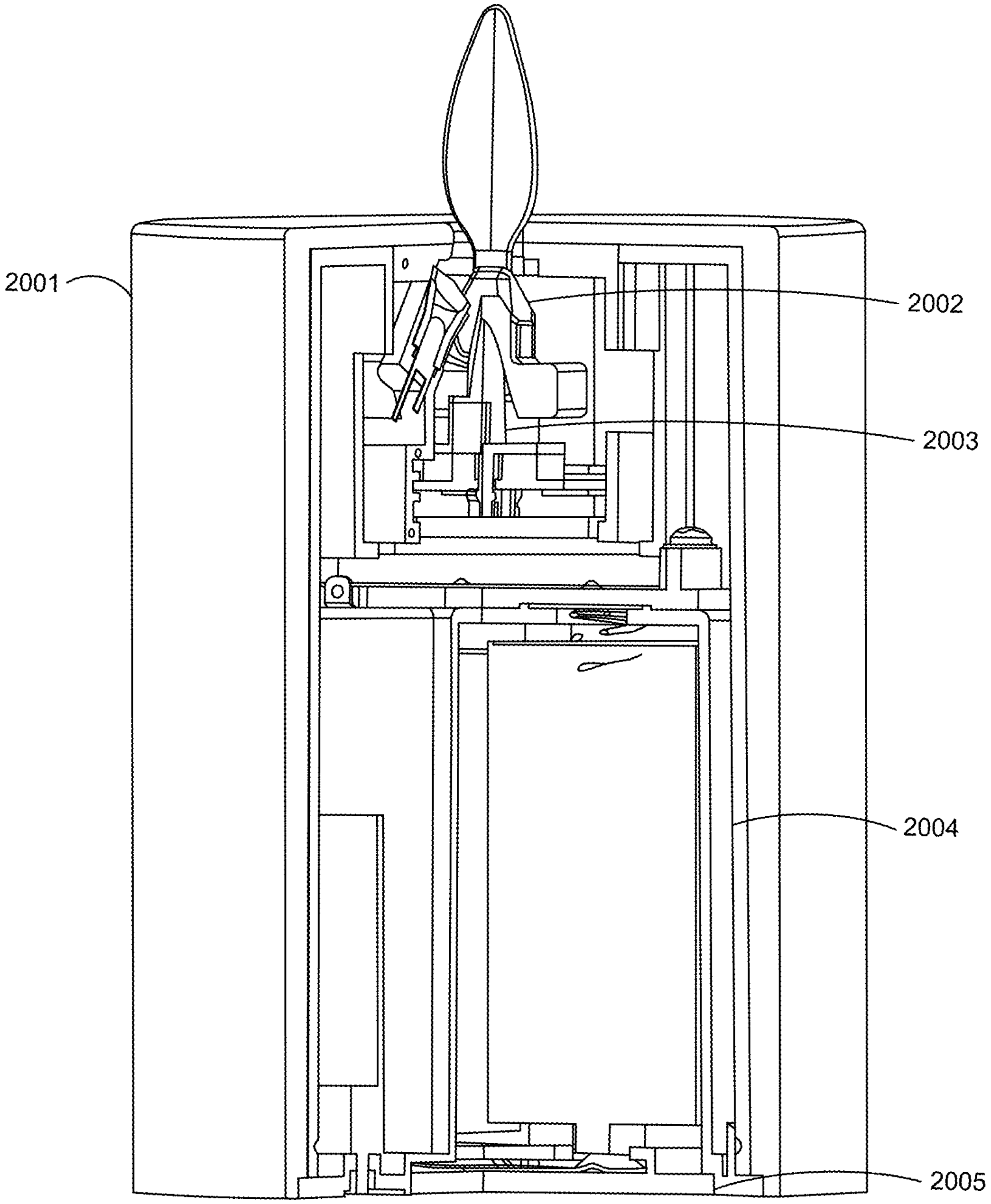
FIG. 12 is cross-sectional view showing the structures of an exemplary second embodiment of a swinging mechanism mount in a flameless candle.
Figure 13:
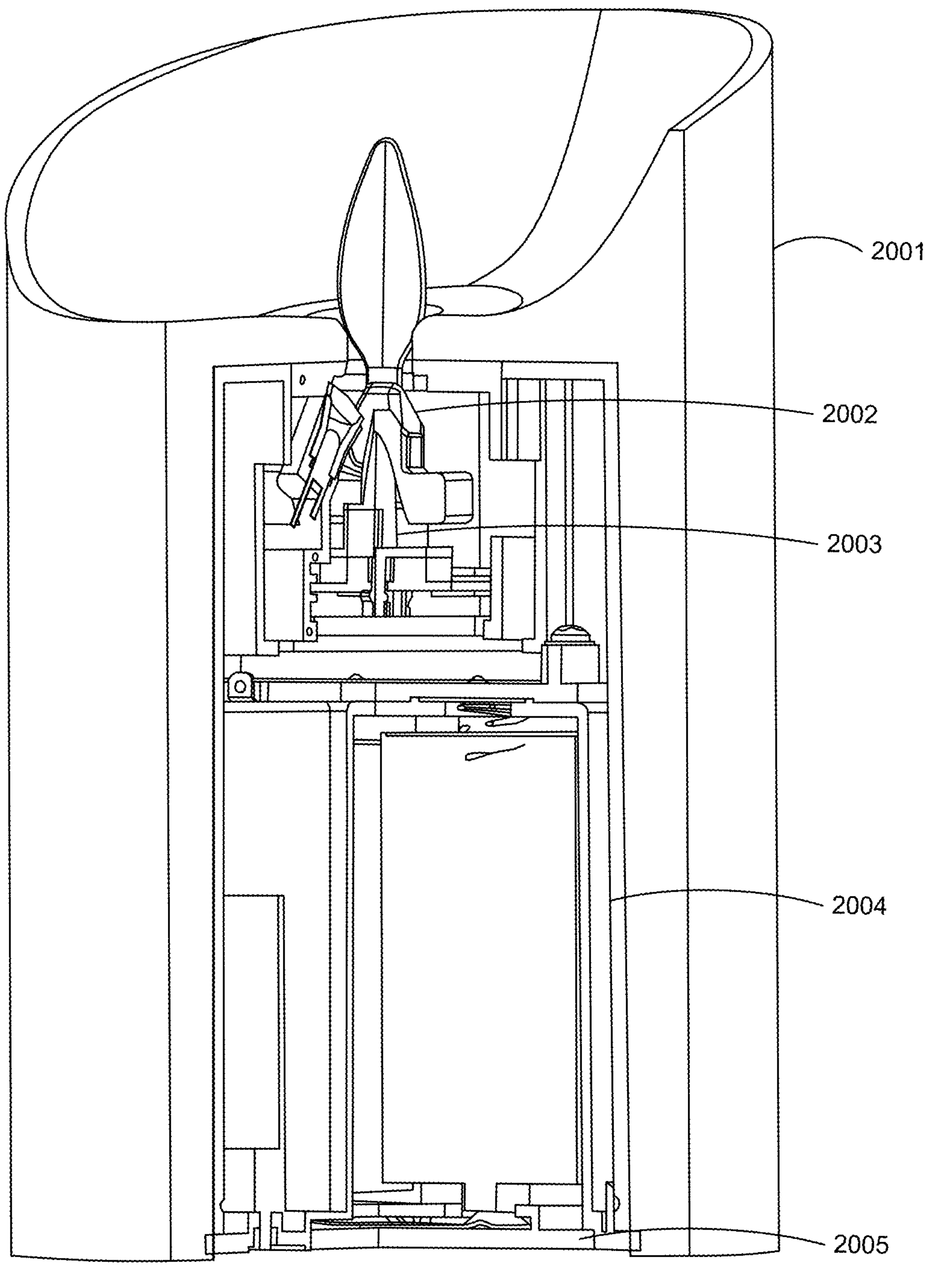
FIG. 13 is cross-sectional view showing the structures of an exemplary second embodiment of a swinging mechanism mount in another flameless candle.
Figure 14A:
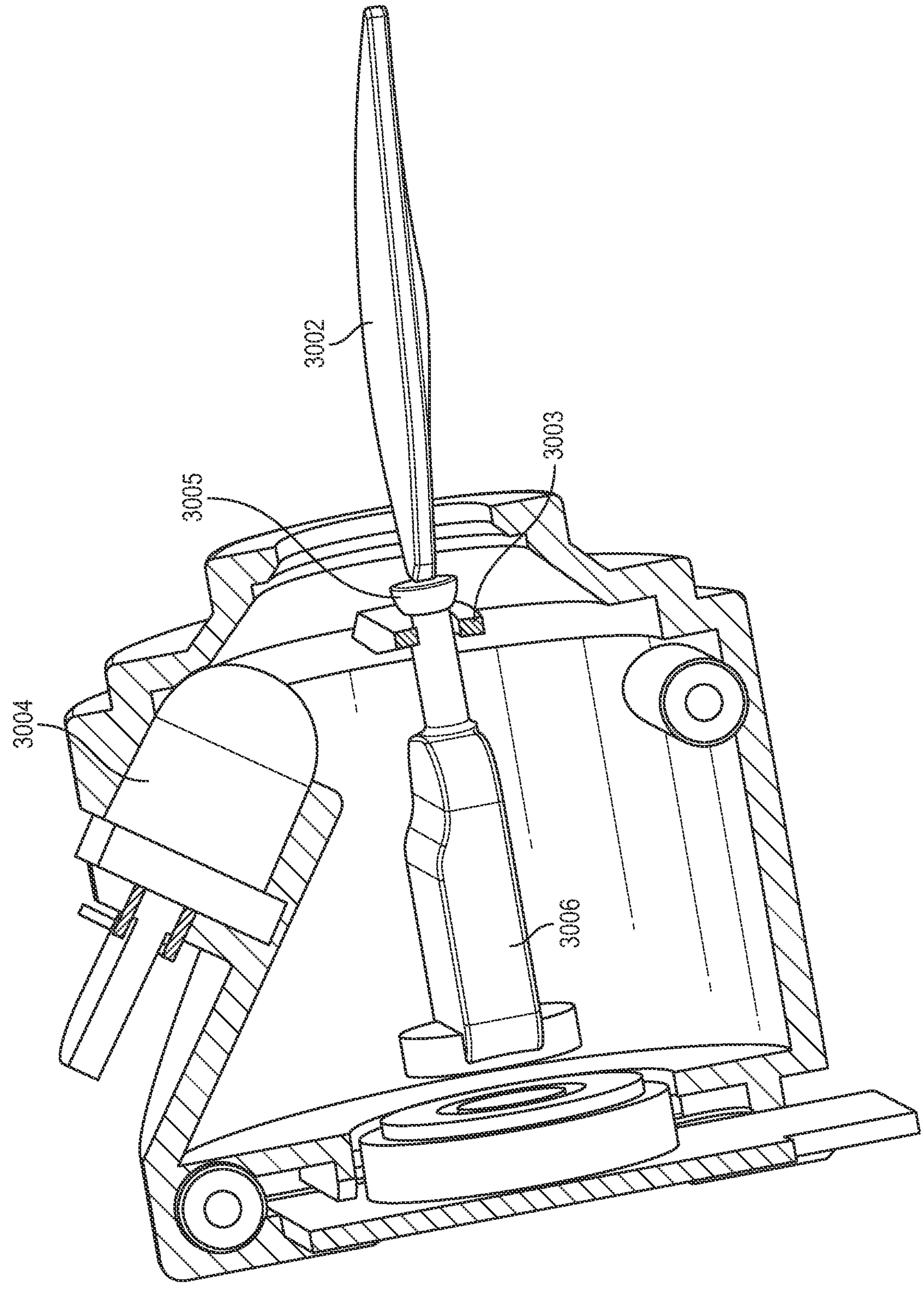
FIG. 14A is a cross-sectional view showing the structures of an exemplary third embodiment of a swinging mechanism mount for a flameless candle.
Figure 14B:
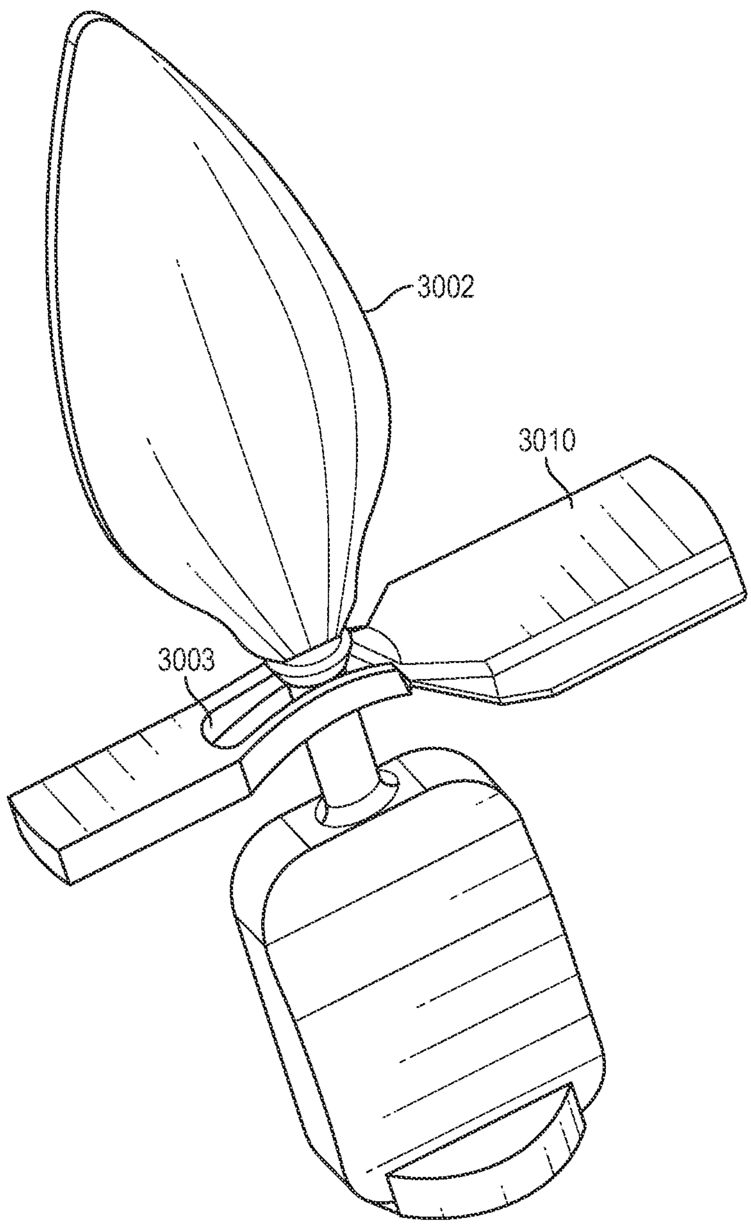
FIG. 14B is a schematic view showing a structure of a flame sheet and support structure of an exemplary third embodiment.
Figure 15:
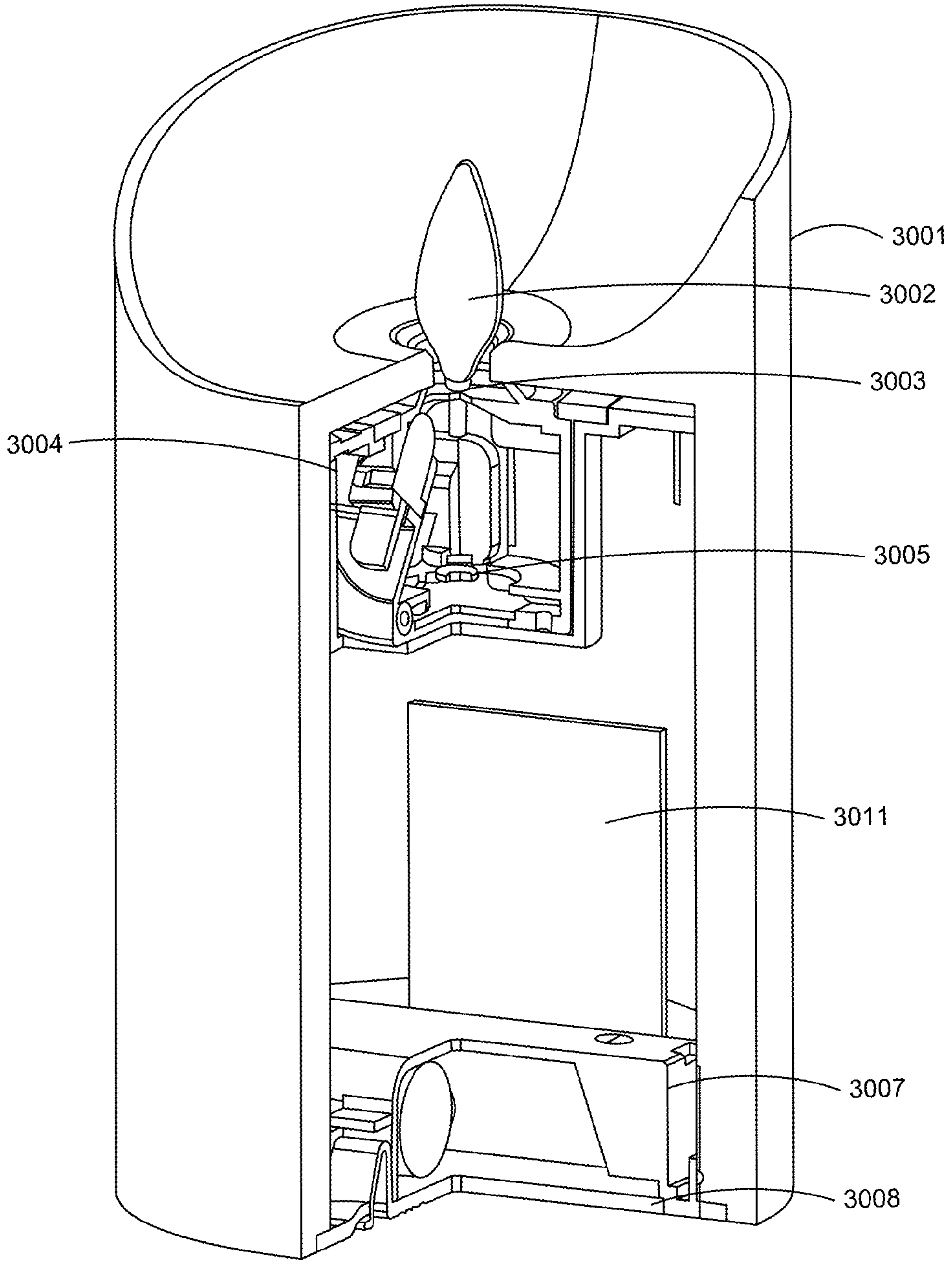
FIG. 15 is cross-sectional view showing the structures of an exemplary third embodiment of a swinging mechanism mount in a flameless candle.

An exemplary second embodiment is shown in FIGS. 11-13 that represent the various views of another swinging mechanism mount for a flameless candle. The swinging mechanism mount in FIGS. 11-13 operates to move a flame sheet fluidly in multiple directions. The swinging mechanism mount is designed to allow the flame sheet to move freely in different motions including swinging laterally along different axes, moving along a curved trajectory, twisting a full three hundred and sixty degrees, or a combination of different motions. The movements may occur simultaneously. The swinging mechanism mount includes a support stand 2003 for supporting the flame sheet. The support stand 2003 is attached to an internal surface within the candle body and extends upwards toward the flame sheet. An internal surface of the flame sheet that contacts the support stand 2003 can be shaped to allow the flame sheet to balance or rest on a top portion of the support stand 2003. For example, in an exemplary embodiment, the internal surface of the flame sheet contacting the support stand 2003 can be curved (e.g., concaved surface with respect to the top portion of the swinging support stand 2003) to conform or mate with a surface of the top portion of the support stand 2003 that contacts the internal surface of the flame sheet. In another exemplary embodiment, the internal surface of the flame sheet contacting the support stand 2003 can be curved (e.g., concaved surface with respect to the top portion of the swinging support stand 2003) to minimize the surface area that contacts the top portion of the swinging support stand 2003. Similarly, the top portion of the support stand 2003 can be shaped to receive or mate with the curved surface of the flame sheet. For example, in an exemplary embodiment, the top portion of the support stand 2003 can have a convex surface with respect to the internal surface of the flame sheet. In an exemplary embodiment, the support stand 2003 and the internal surface of the flame sheet can be shaped to mate together as a ball-and-socket configuration. In an exemplary embodiment, the top portion of the support stand 2003 and/or the internal surface of the flame sheet can be polished or otherwise treated to reduce friction. The support stand 2003 may be made of plastic or metal. In some embodiments, the support stand 2003 may be manufactured as an integrated component of battery housing 2004 or the body of the flameless candle.

The flame sheet 2002 may include one or more magnets towards its bottom portion. The magnets on the flame sheet 2002 causes the flame sheet 2002 to move in response to an electromagnetic field induced by an electromagnet component such as the coil board located below the magnets.

FIGS. 11-13 show other features of a flameless candle. For example, a battery cover 2005 leads to a battery base or housing 2004. The body of the flameless candle can be shaped to include a levelled-off opening 2001. In an exemplary embodiment, the body of the flameless candle can be shaped to include a melted opening as shown in FIG. 13. Positive and negative terminals provide electrical contacts with the battery at the battery base 2004. A switch is provided to turn on and off the flameless candle. A PCB control board includes various control circuitry for controlling different functions of the flameless candle. Another set of positive terminal and a negative terminal are supported by a terminal support stand. In some exemplary embodiments, an attachment mechanism such as screws can be implemented to attach the terminal support stand to the battery housing 2004. The flameless candle can include a semi-opaque inner body. The flameless candle can also include a right support stand and a left support sand. A light source such as a light emitting diode (LED lamp) can be disposed below the top surface of the flameless candle to emit a source light to the flame sheet 2002. The light source can also project through the hole in the top of the candle used by flame sheet 2002. The flameless candle can include an LED support stand and LED lens 2007. Other structures include a coil board to provide electromagnetic field to the magnets to move the flame sheet 2002. The top of the candle body surrounding the hole for flame sheet 2002 can have a leveled-off shape 2001 or a melted shape. It should be noted that some elements of the flameless candle devices that implement the swinging mechanism mount of the second embodiment were previously described in connection with earlier figures and will not be repeated.

As such, as aspect of the disclosed embodiments relates to a swinging mechanism mount for a flameless candle that includes a flame sheet shaped to mimic a real life flame; a light source disposed to emit light to the flame sheet; and a support structure for movably supporting the flame sheet. In an exemplary embodiment of the swinging mechanism mount, the support structure is a support base extending from a base of the flameless candle.

In another embodiment, the above noted swinging mechanism mount is included in a flameless candle.

In an exemplary embodiment, a swinging mount for use in a flameless candle is disclosed wherein, the swinging mount comprises: a flame sheet having an upper portion shaped to mimic a flame of a candle, and a lower portion having a conical structure; and a support stand extending upward towards the conical structure, and having a first end that allows securing the support stand within a body of the flameless candle, the support stand having a second end that includes a top portion that contacts an internal surface of the conical structure, thereby enabling the flame sheet to swing on the top portion of the support stand.

In an exemplary embodiment of a swinging mount, the first end of the support stand is an integrated component of a battery housing.

In an exemplary embodiment of a swinging mount, the interior surface of the conical structure that contact the top portion of the support stand is curved to receive the top portion of the support stand.

In an exemplary embodiment of a swinging mount, the top portion of the support stand includes a curved surface.

In an exemplary embodiment of a swinging mount, the top portion of the support stand includes a polished surface to reduce friction with the interior surface of the conical structure of the flame sheet.

In an exemplary embodiment of a swinging mount, the top portion of the support stand is positioned to support the flame sheet to allow the flame sheet to swing along different axes.

In an exemplary embodiment of a swinging mount, the top portion of the support stand is positioned to allow the flame sheet to move along a curved trajectory.

In an exemplary embodiment of a swinging mount, the top portion of the support stand is positioned to allow the flame sheet to twist up to a full three hundred and sixty degrees.

In an exemplary embodiment of a swinging mount, the support stand comprises a plastic material, a metal, or a combination thereof.

In an exemplary embodiment, the swinging mount further comprises a light source to emit light to the flame sheet.

In an exemplary embodiment of a swinging mount, the light source comprises one or more light emitting diodes (LEDs).

In an exemplary embodiment, a flameless candle for imitating a real-life candle, comprises: a body with a top surface and a bottom surface, the top surface including an opening; a flame sheet having an upper portion shaped to mimic a flame of a candle, and a lower portion having a conical structure; a support stand extending upward towards the conical structure, and having a first end that allows securing the support stand within a body of the flameless candle, the support stand having a second end that includes a top portion that contacts an internal surface of the conical structure, thereby enabling the flame sheet to swing on the top portion of the support stand; a light source disposed under the top surface and positioned to emit light to the flame sheet; and a motion generation engine to cause the flame sheet to swing on the top portion of the support stand.

In an exemplary embodiment of a flameless candle, the first end of the support stand is an integrated component of a battery housing.

In an exemplary embodiment of a flameless candle, the interior surface of the conical structure that contact the top portion of the support stand is curved to receive the top portion of the support stand.

In an exemplary embodiment of a flameless candle, the top portion of the support stand includes a curved surface.

In an exemplary embodiment of a flameless candle, the top portion of the support stand includes a polished surface to reduce friction with the interior surface of the conical structure of the flame sheet.

In an exemplary embodiment of a flameless candle, the top portion of the support stand is positioned to support the flame sheet to allow the flame sheet to swing along different axes.

In an exemplary embodiment of a flameless candle, the top portion of the support stand is positioned to allow the flame sheet to move along a curved trajectory.

In an exemplary embodiment of a flameless candle, the top portion of the support stand is positioned to allow the flame sheet to twist up to a full three hundred and sixty degrees.

In an exemplary embodiment of a flameless candle, the support stand comprises a plastic material, a metal, or a combination thereof.

In an exemplary embodiment, a flameless candle further comprises a light source to emit light to the flame sheet.

In an exemplary embodiment of a flameless candle, the light source comprises one or more light emitting diodes (LEDs).

In an exemplary embodiment of a flameless candle, comprises: a magnet disposed at a base of the flame sheet; wherein: the motion generation engine comprises a coil located below the magnet and electrically connected to a printed circuit board, wherein a magnetic field of the coil interacts with the magnet of the flame sheet to cause the flame sheet to swing on the top portion of the support stand.

In an exemplary embodiment of a flameless candle, the top surface of the body is flat.

In an exemplary embodiment of a flameless candle, the top surface of the body includes an irregular shape to resemble an at least partially melted candle.

Embodiment 3

Figure 16:
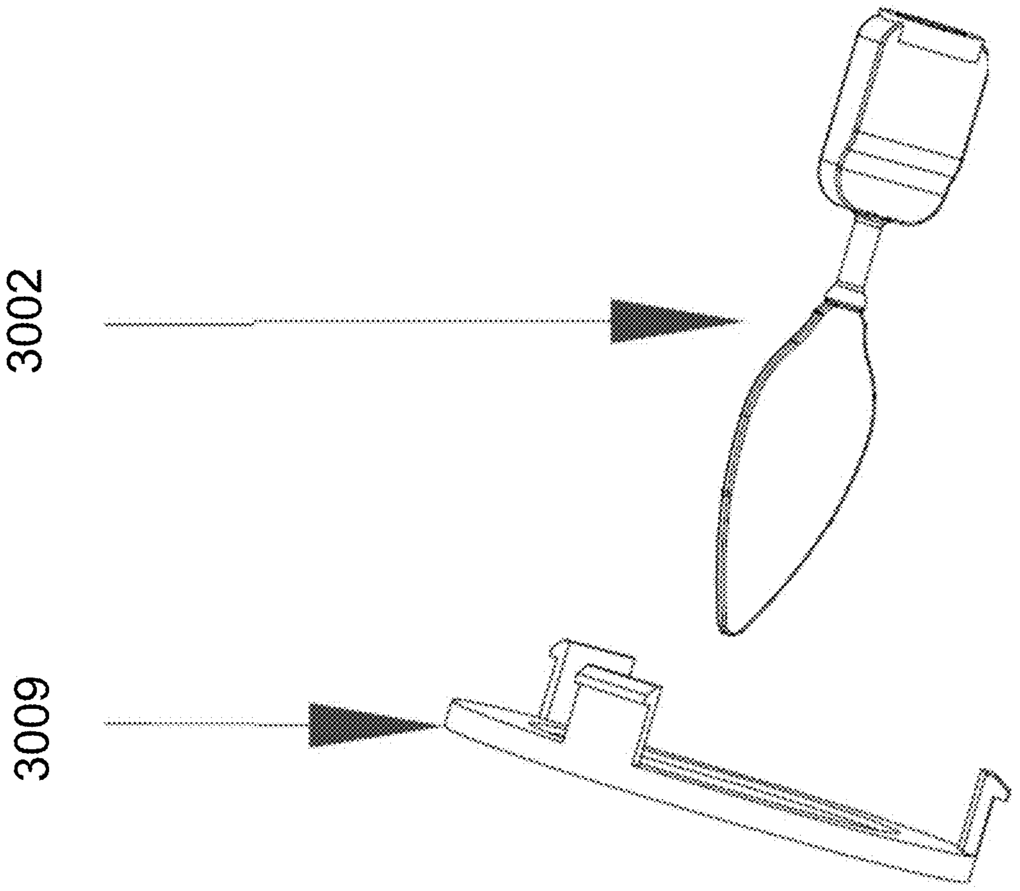
FIG. 16 is a schematic view showing a structure of a flame sheet and engagement ring of an exemplary third embodiment.

An exemplary third embodiment is shown in FIGS. 14A-16 that represent various views of a swinging mechanism mount that operates as a mechanism for moving a flame sheet fluidly in multiple directions. The swinging mechanism mount is designed to allow the flame sheet 3002 to move freely in different motions including swinging laterally along different axes, moving along a curved trajectory, twisting up to a full three hundred and sixty degrees, or a combination of different motions. The movements may occur simultaneously. The swinging mechanism mount includes a support structure 3003 for supporting the flame sheet 3002. The support structure 3003 is attached to an internal side surface of either a right support stand or a left support stand. In an exemplary embodiment, the support structure can have two separate elements with each element attached to a respective support stand. The support structure 3003 extends toward the flame sheet 3002. The end of the support structure 3003 opposite from the attached internal side surface can be shaped to form a 'U' shape, 'C' shape, a slotted shape, an elliptical shape, or circle shape that wraps around the circumference of the flame sheet at or below a tapered structure 3005 of the flame sheet to movably hold the flame sheet 3002. In an exemplary embodiment, the bottom of the flame sheet can include a counterbalance 3006. An internal surface of the shaped end of the support that contacts the flame sheet 3002 can be shaped to allow the flame sheet 3002 to balance or rest thereon. For example, the internal surface of the end of the support structure 3003 can be shaped to receive or mate with the exterior surface of the flame sheet 3002. For example, the internal surface of the end of the support structure 3003 can have a concave surface with respect to the external surface of the flame sheet 3002. Similarly, the external surface of the flame sheet 3002 contacting the end of the support structure 3003 can be curved (e.g., a convex surface with respect to the internal surface of the end of the support structure 3003) to conform or mate with the internal surface of the end of the support structure 3003 that contacts the external surface of the flame sheet. In an exemplary embodiment, the contact areas of the internal surface of the shaped end of the support structure 3003 and the external surface of the flame sheet 3002 can be polished or otherwise treated to reduce friction. The mount may be made of plastic, metal, or both. In an exemplary embodiment, the mount may be manufactured as an integrated component of battery housing 3007 or the body of the flameless candle. In an exemplary embodiment, the end of the support structure 3003 and the external surface of the flame sheet can be shaped to mate together as a rod-and-open ring configuration. In an exemplary embodiment, the support structure 3003 includes first and second elements that can be paired together so that the two elements together provide an opening that movably holds the flame sheet 3002. For example, FIG. 14B shows an exemplary first element 3003 and second elements 3010 paired together to provide an opening that movably holds the flame sheet 3002. In an exemplary embodiment the first and second elements may extend from interior surfaces of the support stands that are opposite to each other. An engaging ring can be disposed to surround the exterior of the left and right support stands to hold the support stands together. An exemplary engagement ring 3009 that includes protrusions to allow the engagement ring to be easily and securely placed in the flameless candle is shown in FIG. 16.

In FIGS. 14A-16, various other features are shown. For example a battery cover 3008 leads to a battery base or housing 3007. The body of the flameless candle can be shaped to include a levelled-off or melted opening 3001. At the battery base 3007, positive-negative terminals provide electrical connections to positive and negative leads of a battery at one end. A switch can be provided for turning on and off the flames candle. A PCB control board 3006 includes various control circuitry for controlling various functions of the flameless candle. Another set of positive and negative terminals are provided at another end of the battery. The flameless candle can include a semi-opaque inner body. A right support stand and a left support stand are provided inside the body of the flameless candle. A light source support stand provides physical support for a light source 3004, such as light emitting diodes (LEDs). A lens, such as LED lens can be disposed over the LEDs to emit the source light. The light source 3004 can also project through the hole in the top of the candle used by flame sheet 3002. Other features of the flameless candle can include a magnet 3005 attached to a bottom portion of the flame sheet 3002. A coil board can be disposed below the magnet 3005 to provide an electromagnetic field to the magnet 3005 attached to the bottom portion of the flame sheet to induce movement of the flame sheet 3002. A coil engaging ring can be provided to support the coil board. The body of the flameless candle can be shaped have an opening mimicking a melted candle 3001 or a levelled-off appearance. It should be noted that some elements of the flameless candle devices that implement the swinging mechanism mount of the third embodiment were previously described and will not be repeated.

As such, as aspect of the disclosed embodiments relates to a swinging mechanism mount for a flameless candle that includes a flame sheet shaped to mimic a real life flame; a light source disposed to emit light to the flame sheet; and a support structure for movably supporting the flame sheet. In an exemplary embodiment of the swinging mechanism mount, the support structure is a support structure extending from an internal surface of the flameless candle.

In another embodiment, the above noted swinging mechanism mount is included in a flameless candle.

In an exemplary embodiment, a swinging mount for use in a flameless candle is disclosed wherein, the swinging mount comprises: a flame sheet having an upper portion shaped to mimic a flame of a candle, and a lower portion including a tapered structure and a counterbalance; and a support structure having a first end that allows the support structure to be securely attached to the swinging mount, the support structure having a second end that includes two spaced-apart segments that receive the flame sheet below the tapered structure and movably suspend the flame sheet within the spaced-apart segments.

In an exemplary embodiment of a swinging mount, the support structure includes an additional element that when paired with the second end of the support structure forms an opening that movably holds the flame sheet.

In an exemplary embodiment of a swinging mount, the first end of the support structure is attached to an internal side surface of a support stand.

In an exemplary embodiment of a swinging mount, the first end of the support structure is an integrated component of a battery housing.

In an exemplary embodiment of a swinging mount, the two space-apart segments form one of a: U-shaped, C-shaped, a slotted shaped, an elliptical shaped, or a circular shaped element that wraps around the circumference of the flame sheet at or below a conical structure of the flame sheet to movably hold the flame sheet.

In an exemplary embodiment of a swinging mount, the support structure is positioned to support the flame sheet to allow the flame sheet to swing along different axes.

In an exemplary embodiment of a swinging mount, the two spaced-apart segments of the support structure are positioned to allow flame sheet to move along a curved trajectory.

In an exemplary embodiment of a swinging mount, the two spaced-apart segments of the support structure are positioned to allow the flame sheet to twist up to a full three hundred and sixty degrees.

In an exemplary embodiment of a swinging mount, the support structure comprises a plastic material, a metal, or a combination thereof.

In an exemplary embodiment, a swinging mount further comprises a light source to emit light to the flame sheet.

In an exemplary embodiment of a swinging mount, the light source comprises one or more light emitting diodes (LEDs).

In an exemplary embodiment, a flameless candle for imitating a real-life candle, comprising: a body with a top surface and a bottom surface, the top surface including an opening; a flame sheet having an upper portion shaped to mimic a flame of a candle, and a lower portion including a tapered structure and a counterbalance; a support structure having a first end that allows the support structure to be securely attached to the swinging mount, the support structure having a second end that includes two spaced-apart segments that receive the flame sheet below the tapered structure and movably suspend the flame sheet within the spaced-apart segments; a light source disposed under the top surface and positioned to emit light to the flame sheet; and a motion generation engine to cause the flame sheet to move.

In an exemplary embodiment of a flameless candle, the support structure includes an additional element that when paired with the second end of the support structure forms an opening that movably holds the flame sheet.

In an exemplary embodiment of a flameless candle, the first end of the support structure is attached to an internal side surface of a support stand.

In an exemplary embodiment of a flameless candle, the first end of the support structure is an integrated component of a battery housing.

In an exemplary embodiment of a flameless candle, the two space-apart segments form one of a: U-shaped, C-shaped, a slotted shaped, an elliptical shaped, or a circular shaped element that wraps around the circumference of the flame sheet at or below a conical structure of the flame sheet to movably hold the flame sheet.

In an exemplary embodiment of a flameless candle, the support structure is positioned to support the flame sheet to allow the flame sheet to swing along different axes.

In an exemplary embodiment of a flameless candle, the two spaced-apart segments of the support structure are positioned to allow the flame sheet to move along a curved trajectory.

In an exemplary embodiment of a flameless candle, the two spaced-apart segments of the support structure are positioned to allow the flame sheet to twist up to a full three hundred and sixty degrees.

In an exemplary embodiment of a flameless candle, the support structure comprises a plastic material, a metal, or a combination thereof.

In an exemplary embodiment, a flameless candle, comprising: a magnet disposed at a base of the flame sheet; wherein: the motion generation engine including a coil located below the magnet and electrically connected to a printed circuit board, wherein a magnetic field of the coil interacts with the magnet of the flame sheet to cause the flame sheet to move.

In an exemplary embodiment of a flameless candle, the top surface of the body is flat.

In an exemplary embodiment of a flameless candle, the top surface of the body includes an irregular shape to resemble an at least partially melted candle.

In an exemplary embodiment of a flameless candle, the light source comprises one or more light emitting diodes (LEDs).

Embodiment 4

Figure 17:
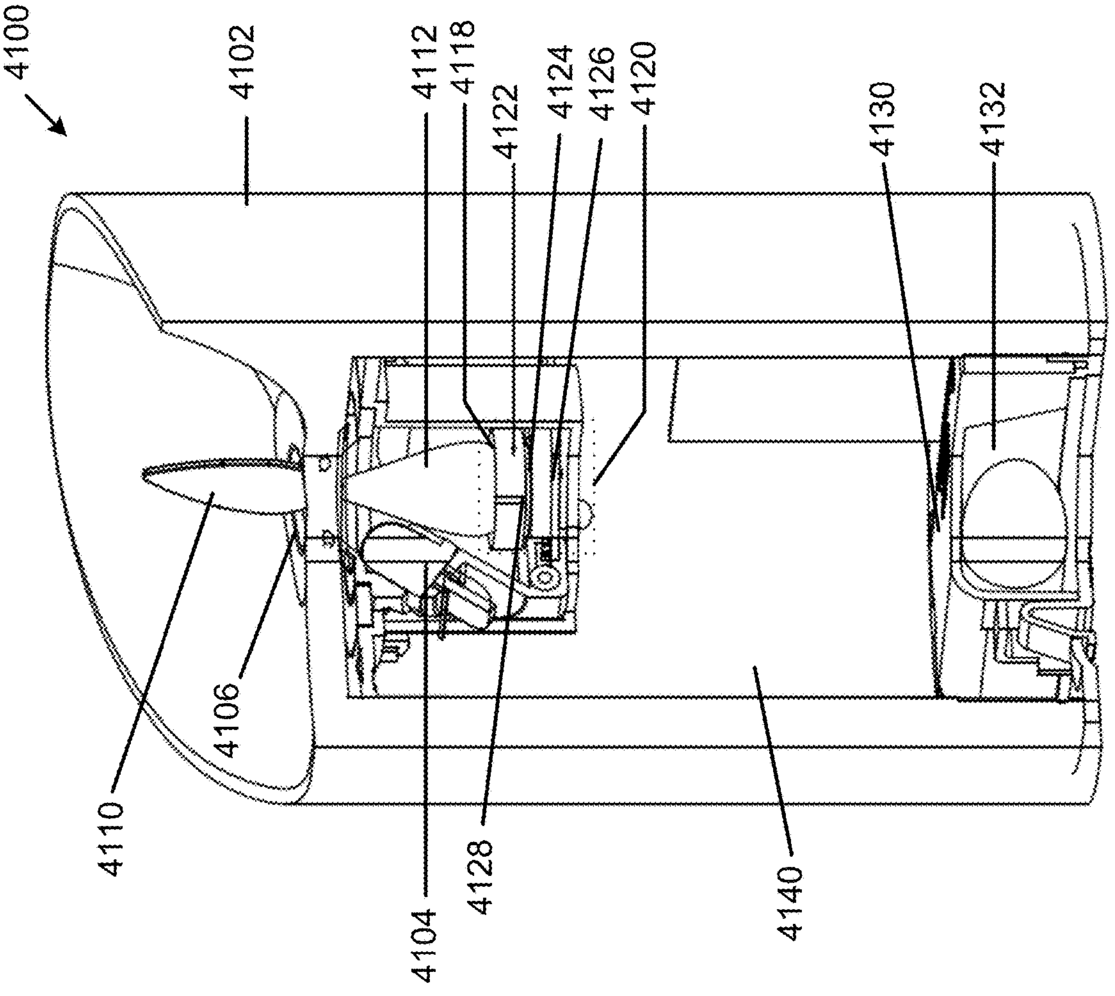
FIG. 17 is cross-sectional view showing the structures of an exemplary fourth embodiment of a swinging mechanism mount in a flameless candle.
Figure 18:
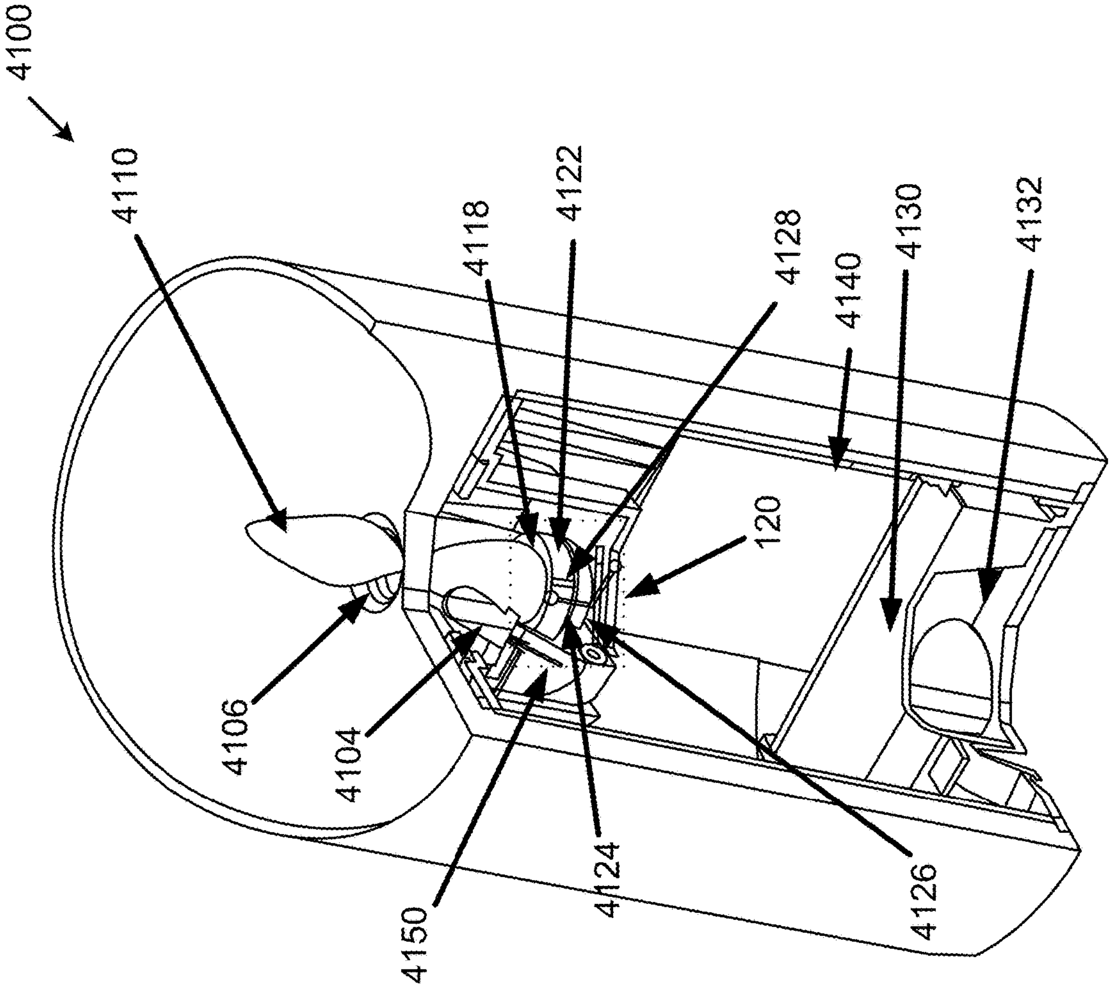
FIG. 18 is another cross-sectional view showing the structures of an exemplary fourth embodiment of a swinging mechanism mount in a flameless candle.

An exemplary fourth embodiment is shown in FIGS. 17-18 that represent various views of a tumbler mechanism mount 4120 of a flameless candle 4100. The flameless candle 4100 includes a flame sheet 4110, a body or a shell 4102, a light source 4104, such as one or more light emitting diodes, and a tumbler mechanism 4120 supporting the flame sheet 4110. The tumbler mechanism mount 4120 in FIGS. 17-18 operates as a mechanism for moving a flame sheet 4110 fluidly in multiple directions. The tumbler mechanism mount 4120 is designed to allow the flame sheet 4110 to move freely in different motions including tumbling or gyrating laterally along different axes, moving along a curved trajectory, twisting up to a full three hundred and sixty degrees, or a combination of different motions. The movements may occur simultaneously.

The tumbler mechanism mount 4120 includes a base structure 4122 for supporting the flame sheet 4110. The flame sheet 4110 can sit or rest on the base structure 4122 of the tumbler mechanism mount 4120 so that a bottom portion 4112 of the flame sheet 4110 having a magnet 4118 attached can sit or rest on a surface of the base structure 4122 of the tumbler mechanism. In an exemplary embodiment, the flame sheet 4110 can sit or rest on a recessed area included in the base structure 4122. A magnet 4124 is placed below the base structure 4122 of the tumbler mechanism 4120. A coil structure 4128 is located under the base structure 4122 of the tumbler. Also, another coil structure 4126 is located under a coil mounting bracket. Thus, the tumbler can tumble or gyrate laterally along different axes by moving in response to a magnetic force or a magnetic field.

The base structure 4122 is fixed. Thus, rather than the base structure 4122 moving to cause the movement of the flame sheet 4110, electrical stimulus applied through the base structure 4122 of the tumbler mechanism mount 4120 provides the energy to cause the flame piece to move. When the electrical stimulus is provided to the combination of the magnet 4124 and coil structures 4128 and 4126, an electromagnetic force is applied to the magnet 4118 attached to the bottom portion 4112 of the flame sheet 4110 to cause the flame sheet 4110 to move. The electrical stimulus can be controlled by control circuitry.

In FIGS. 17-18, various other features are shown. For example a battery cover 4130 leads to a battery base or housing 4132. The body of the flameless candle can be shaped to include a levelled-off or melted opening. At the battery base 4132, positive-negative terminals provide electrical connections to positive and negative leads of a battery at one end. A switch can be provided for turning on and off the flames candle. A PCB control board can be provided to include various control circuitry for controlling various functions of the flameless candle. The flameless candle can include a semi-opaque inner body 4140. A light source support stand 4150 provides physical support for a light source 4104, such as light emitting diodes (LEDs). A lens, such as LED lens can be disposed over the LEDs to emit the source light. The light source 4104 can also project through the hole 4106 in the top of the candle 4100 used by flame sheet 4110. The body of the flameless candle 4100 can be shaped have an opening mimicking a melted candle or a levelled-off appearance. It should be noted that some elements of the flameless candle devices that implement the swinging mechanism mount of the fourth embodiment were previously described and will not be repeated.

As such, as aspect of the disclosed embodiments relates to a tumbler mechanism mount for a flameless candle that includes a flame sheet shaped to mimic a real life flame; a light source disposed to emit light to the flame sheet; and a support structure for movably supporting the flame sheet. In an exemplary embodiment of the tumbler mechanism mount, the support structure is fixed. In an exemplary embodiment of the tumbler mechanism mount, the support structure includes a base structure. In an exemplary embodiment of the tumbler mechanism mount, the support structure includes a magnet disposed under the base structure. In an exemplary embodiment of the tumbler mechanism mount, the support structure includes at least one coil structure under the base structure. In an exemplary embodiment of the tumbler mechanism mount, a magnet is attached under a bottom portion of the flame sheet.

In another embodiment, the above noted swinging mechanism mount is included in a flameless candle.

In an exemplary embodiment, a tumbler mount for use in a flameless candle, the tumbler mount comprising: a flame sheet having an upper portion shaped to mimic a flame of a candle, and a lower portion having a conical structure and a magnet; and a base structure secured to the flameless candle, the base structure including a recessed area for enabling the conical structure to rest in the recessed area of the base station and to allow the conical structure to tumble or gyrate laterally along different axes in response to a magnetic force or a magnetic field.

In an exemplary embodiment of the tumbler mount, the base structure is positioned to support the flame sheet to allow the flame sheet to swing along different axes.

In an exemplary embodiment of the tumbler mount, the base structure is positioned to allow the flame sheet to move along a curved trajectory.

In an exemplary embodiment of the tumbler mount, the base structure is positioned to allow the flame sheet to twist up to a full three hundred and sixty degrees.

In an exemplary embodiment, the tumbler mount further comprises a light source to emit light to the flame sheet.

In an exemplary embodiment of the tumbler mount, the light source comprises one or more light emitting diodes (LEDs).

In an exemplary embodiment, a flameless candle for imitating a real-life candle comprises: a body with a top surface and a bottom surface, the top surface including an opening; a flame sheet having an upper portion shaped to mimic a flame of a candle, and a lower portion having a conical structure and a magnet; a base structure secured to the flameless candle, the base structure including a recessed area for enabling the conical structure to rest in the recessed area of the base station and to allow the conical structure to tumble or gyrate laterally along different axes in response to a magnetic force or a magnetic field; a light source disposed under the top surface and positioned to emit light to the flame sheet; and a motion generation engine to cause the flame sheet to move.

In an exemplary embodiment of a flameless candle, the base structure is positioned to support the flame sheet to allow the flame sheet to swing along different axes.

In an exemplary embodiment of a flameless candle, the base structure is positioned to allow the flame sheet to move along a curved trajectory.

In an exemplary embodiment of a flameless candle, the base structure is positioned to allow the flame sheet to twist up to a full three hundred and sixty degrees.

In an exemplary embodiment, a flameless candle comprises: a magnet disposed at a base of the flame sheet; wherein: the motion generation engine including a coil located below the magnet and electrically connected to a printed circuit board, wherein a magnetic field of the coil interacts with the magnet of the flame sheet to cause the flame sheet to tumble or gyrate laterally along different axes.

In an exemplary embodiment of a flameless candle, the top surface of the body is flat.

In an exemplary embodiment of a flameless candle, the top surface of the body includes an irregular shape to resemble an at least partially melted candle.

In an exemplary embodiment of a flameless candle, the light source comprises one or more light emitting diodes (LEDs).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In particular, in exemplary embodiments described in connection with the above figures, certain features of flameless candles are described in exemplary configurations to facilitate understanding of the described features. It is understood, however, that different features can be combined or removed in additional embodiments. Thus, the features and components described for one exemplary embodiment can be easily combined with or added to another exemplary embodiment by a person of ordinary skill in the art.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made based on what is described and illustrated in this patent document.

Some of components of the disclosed devices can be implemented using hardware circuits, software, or combinations thereof. For example, a hardware circuit implementation can include discrete analog and/or digital components that are, for example, integrated as part of a printed circuit board. Alternatively, or additionally, some of the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

What is claimed is:

1. A flameless candle, comprising:

a body with a top surface that includes an opening;

a flame sheet having an upper portion shaped to mimic a flame of a candle, a middle portion having a tapered structure, and a lower portion that includes a counterbalance;

a support structure comprising:

a first element and a second element, a first support stand configured to support the first element and a second support stand configured to support the second element, and an engaging ring disposed to surround exterior surfaces of the first support stand and the second support stand to hold the first support stand and the second support stand together, wherein each of the first element and the second element has an end, wherein two ends of the first element and the second element are configured to be in contact and pair together to form another opening, wherein each end of the first element and the second element has a concave surface to form a concave contact area to allow the tapered structure of the middle portion to rest thereon, and wherein the another opening allows the support structure to surround the middle portion of the flame sheet below the tapered structure to movably support the middle portion of the flame sheet at a point of contact;

a light source disposed under the top surface and positioned to emit light to the flame sheet; and a control circuitry configured to control an operation of the flameless candle.

2. The flameless candle of claim 1, wherein the top surface of the body includes an irregular shape to resemble an at least partially melted candle.

3. The flameless candle of claim 1, wherein the light source comprises one or more light emitting diodes (LEDs).

4. The flameless candle of claim 1, wherein the support structure allows the flame sheet to twist up to three hundred and sixty degrees.

5. The flameless candle of claim 1, wherein each end of the first element and the second element is shaped to form a 'U' shape, 'C' shape, or a slotted shape.

6. The flameless candle of claim 1, wherein an external surface of the flame sheet and the concave contact area are polished to reduce friction between the support structure and the flame sheet.

7. The flameless candle of claim 1, wherein the support structure is part of a swinging mount that is integrated with the body of the flameless candle.

8. The flameless candle of claim 1, comprising a semi-opaque inner body coupled to the support structure.

9. The flameless candle of claim 1, comprising a battery cover removably coupled to a battery housing.

10. The flameless candle of claim 1, comprising a switch configured to turn on and/or off the flameless candle.

11. The flameless candle of claim 1, wherein the control circuitry is configured to control an electrical stimulus provided to the flameless candle.

12. The flameless candle of claim 1, comprising a light source support stand configured to support the light source.

13. The flameless candle of claim 1, wherein the lower portion comprises a bottom part having a circular shape.

14. A support structure for a flameless candle that comprises a flame sheet, comprising:

a first element and a second element, wherein the first element is supported by a first support stand and the second element is supported by a second support stand, wherein the first support stand the second support stand are configured to be held together by an engaging ring disposed to surround exterior surfaces of the first support stand and the second support stand, wherein each of the first element and the second element has an end, wherein two ends of the first element and the second element are configured to be in contact and pair together to form an opening, wherein each end of the first element and the second element has a concave surface to form, when the two ends pair together, a concave contact area to allow a tapered structure of the flame sheet to rest thereon, and wherein the opening has a first diameter that is smaller than a second diameter of the tapered structure such that the support structure surrounds the flame sheet below the tapered structure to movably support the flame sheet at a point of contact.

15. The support structure of claim 14, wherein each end of the first element and the second element is shaped to form a ‘U’ shape, ‘C’ shape, or a slotted shape.

16. The support structure of claim 14, wherein the support structure allows the flame sheet to twist up to three hundred and sixty degrees.

17. The support structure of claim 14, wherein the concave contact area is polished to reduce friction between the support structure and the flame sheet.

18. The support structure of claim 14, wherein the support structure is part of a swinging mount that is integrated with a body of the flameless candle.

* * * * *